US010356655B2

United States Patent
Chen et al.

(10) Patent No.: US 10,356,655 B2
(45) Date of Patent: Jul. 16, 2019

(54) DATA RATE CONTROL METHOD AND RELATED APPARATUSES USING THE SAME

(71) Applicant: Acer Incorporated, New Taipei (TW)

(72) Inventors: Hung-Chen Chen, New Taipei (TW); Ching-Wen Cheng, New Taipei (TW)

(73) Assignee: Acer Incorporated, New Taipei (TW)

( * ) Notice: Subject to any disclaimer, the term of this patent is extended or adjusted under 35 U.S.C. 154(b) by 115 days.

(21) Appl. No.: 15/399,676

(22) Filed: Jan. 5, 2017

(65) Prior Publication Data
US 2017/0201902 A1 Jul. 13, 2017

Related U.S. Application Data

(60) Provisional application No. 62/275,797, filed on Jan. 7, 2016.

(51) Int. Cl.
*H04W 28/02* (2009.01)
*H04W 28/22* (2009.01)
(Continued)

(52) U.S. Cl.
CPC ... *H04W 28/0268* (2013.01); *H04W 28/0215* (2013.01); *H04W 28/0247* (2013.01);
(Continued)

(58) Field of Classification Search
CPC ......... H04W 28/0215; H04W 28/0247; H04W 28/0268; H04W 60/04; H04W 72/048; H04W 28/22

See application file for complete search history.

(56) References Cited

U.S. PATENT DOCUMENTS 6,889,050 B1 * 5/2005 Willars .................. H04L 47/10
370/329
8,806,033 B1 * 8/2014 Vinapamula Venkata ..................
H04L 45/302
709/228

(Continued)

FOREIGN PATENT DOCUMENTS

EP 2605583 6/2013
TW 201212689 3/2012

OTHER PUBLICATIONS

"3rd Generation Partnership Project; Technical Specification Group Radio Access Network; Evolved Universal Terrestrial Radio Access Network(E-UTRAN); S1 Application Protocol (S1AP) (Release 13)," 3GPP TS 36.413 V13.1.0, Dec. 2015, pp. 1-314.

(Continued)

*Primary Examiner* — Redentor Pasia
(74) *Attorney, Agent, or Firm* — JCIPRNET

(57) ABSTRACT

The disclosure is directed to a data rate modification method and related apparatuses using the same method. According to one of the exemplary embodiment, the disclosure is directed to a data rate control method implemented by a user equipment, the method would include not limited to: transmitting a connection establishment message which comprises an identification (ID) of the UE and a network ID; receiving a data rate configuration comprising a first data rate class ID and a plurality of network data rates which is associated with the network ID as each network data rate is associated with a different data rate class ID; and setting a first data rate based on the first data rate class ID to communicate with a core network.

22 Claims, 14 Drawing Sheets

(51) Int. Cl.
*H04W 60/04* (2009.01)
*H04W 72/04* (2009.01)

(52) U.S. Cl.
CPC .......... *H04W 28/22* (2013.01); *H04W 60/04* (2013.01); *H04W 72/048* (2013.01)

(56) References Cited

U.S. PATENT DOCUMENTS

| | | | |
|---|---|---|---|
| 2008/0045272 A1 | 2/2008 | Wang et al. | |
| 2009/0052384 A1* | 2/2009 | Zisimopoulous | H04L 47/14 370/329 |
| 2009/0103454 A1* | 4/2009 | Watanabe | H04L 47/14 370/254 |
| 2009/0129275 A1* | 5/2009 | Watanabe | H04L 12/46 370/235 |
| 2010/0208698 A1* | 8/2010 | Lu | H04W 36/0027 370/331 |
| 2012/0213072 A1* | 8/2012 | Kotecha | H04W 28/0268 370/235 |
| 2014/0023013 A1* | 1/2014 | Lee | H04W 28/24 370/329 |
| 2014/0036836 A1* | 2/2014 | Zisimopoulos | H04L 47/14 370/329 |
| 2015/0201418 A1* | 7/2015 | Zhang | H04W 76/38 370/329 |
| 2015/0215845 A1* | 7/2015 | Pinheiro | H04W 48/06 455/418 |
| 2015/0257050 A1 | 9/2015 | Karimli et al. | |
| 2016/0014799 A1* | 1/2016 | Aydin | H04W 72/1257 370/329 |
| 2017/0150416 A1* | 5/2017 | Malhotra | H04W 36/32 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP TS 23.401 V13.5.0, Dec. 2015, pp. 1-337.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.1.0, Sep. 2015, pp. 1-254.

* cited by examiner

DATA RATE CONTROL METHOD AND RELATED APPARATUSES USING THE SAME

CROSS-REFERENCE TO RELATED APPLICATION

This application claims the priority benefits of U.S. provisional application Ser. No. 62/275,797, filed on Jan. 27, 2016. The entirety of the above-mentioned patent application is hereby incorporated by reference herein and made a part of this specification.

TECHNICAL FIELD

The disclosure is directed to a data rate control method and related apparatuses using the same method.

BACKGROUND

Conventionally, a maximum data rate used by a network could be closely related to the quality of service (QoS) parameters. FIG. 1 illustrates a reference network architecture used by a 3GPP Evolved Packet System (EPS). Under this network architecture, the mobility management entity (MME) 101 would suggest QoS parameters which may include a maximum data rate to a serving gateway (S-GW) 104, and the QoS parameters may be transmitted from S-GW 104 to a packet data network gateway (P-GW) 102. The P-GW 102 may then authorize the QoS parameters to the S-GW 104, and the authorized QoS parameters may be transmitted from S-GW 104 to the MME 101. The MeNB 103 may then control the allocation and utilization of radio resources to maintain the authorized QoS parameters.

FIG. 2 illustrates a signaling diagram for configuring the maximum data rate of a communication system. For the communication system of FIG. 2, the downlink (DL) and uplink (UL) maximum data rate is decided when a packet data network (PDN) connection, which is the connection between a user equipment (UE) and a P-GW, has been set up. The phrase 'PDN connection' could be synonymous with the phrase 'PDU session' which is used predominately in a 5G network. Mobile communications has evolved towards the integration of radio access technologies and the aggregation of radio resources for UEs in order to achieve the high data rate and high capacity requirements of a next generation of a mobile communication system. For example, the mobile communication systems may utilize licensed and unlicensed spectrum for providing communication services to users to enhance the throughput. However, the available radio resources for a UE may vary drastically when the UE is moving. For example, when a UE served by a low frequency radio access node moves into the coverage of an overlaid high frequency radio access node that could support high data rate transmission, the UE may utilize the radio resources of both low frequency (e.g. RF frequency) and high frequency (e.g. mmWave) radio access nodes. When the UE moves out of the coverage of the high frequency radio access node but still served by the low frequency radio access node, the available radio resource of the UE may decrease dramatically.

To reflect the variation of the available radio resources for a UE, the maximum data rate control function within the future network would still be needed to ensure that the maximum data rate as required by the authorized QoS parameters are maintained. The resource management function within the future network could be responsible for how the resources are distributed in the access network based on the authorized QoS parameters from the QoS operation control function as well as the monitoring of the fulfillment of the QoS targets. The resource management function could be different between a 3GPP and a non-3GPP standard with regard to the possibilities to control resource utilization and resource availability.

FIG. 3 illustrates QoS configuration in a 5G QoS framework from the perspective of a control plane. According to 3GPP TR 23.799 v.1.0.2, one candidate implementation of 5G QoS framework could be to have QoS parameters assigned to a PDU flow distributed by the core network control plane (CN_CP) to the core network user plane (CN_UP), the 3GPP access network and optionally the UE, and are enforced by the network functions such as by CN-UP, access network, and optionally UE. The QoS parameters would impose a required data rate per PDU flow which is required for the service to be delivered with sufficient QoS. The required data rate per PDU flow would be used by the access network which would tries to uphold the required data rate.

In FIG. 3 for example, the radio access network (RAN) 301 and the core network control plane function 302 would uphold the DL/UL QoS configuration which would include the maximum data rate, and the core network user plane function 303 would dispatch the DL/UL QoS rule and parameter to the RAN 301 and the core network control plane function 302. When the access network cannot satisfy the required data rate, the access network may either drop the packet or to provide a best effort service with or without any signaling to the core network based on the network behavior per PDU flow. A QoS rule may include the information of QoS rule identifier, QoS class identifier, the DL and/or UL maximum data rate, the DL and/or UL guaranteed bitrate, the priority of a QoS rule, flow detection and filtering information. QoS parameters may include the QoS class identifier, the DL and/or UL maximum data rate, the DL and/or UL guaranteed bitrate, the number of allowed DL and/or UL packets in a specific time duration, and the priority.

In general, a mechanism to dynamically adjust the maximum data rate according to the available radio resource could be needed.

SUMMARY OF THE DISCLOSURE

Accordingly, the disclosure is directed to a data rate modification method and related apparatuses using the same method.

According to one of the exemplary embodiments, the disclosure is directed to a data rate modification method implemented by a user equipment. The method would include not limited to: transmitting a connection establishment message which includes an identification (ID) of the UE and a network ID; receiving a data rate configuration including a first data rate class ID and a plurality of network data rates which is associated with the network ID as each network data rate is associated with a different data rate class ID; and setting a first data rate based on the first data rate class ID to communicate with a core network.

According to one of the exemplary embodiments, the disclosure is directed to a data rate modification method implemented by a base station. The method would include not limited to: receiving a connection establishment message which includes an identification (ID) of the UE and a network ID; receiving a first data rate configuration message including a first data rate class ID, a plurality of network data rates which is associated with the network ID as each network data rate is associated with a radio access network (RAN) data rate and a different data rate class ID; transmitting a second data rate configuration including the first data rate class ID and the network data rate which is associated with the network ID; and providing a first data rate based on the first data rate class ID.

According to one of the exemplary embodiments, the disclosure is directed to a user equipment which includes not limited to a transmitter, a receiver, and a processor coupled to the transmitter and the receiver and configured at least to: transmitting, via the transmitter, a connection establishment message which includes an identification (ID) of the UE and a network ID; receiving, via the receiver, a data rate configuration including a first data rate class ID and a plurality of network data rates which is associated with the network ID as each data rate corresponds to a different data rate class ID; and setting a first data rate based on the first data rate class ID to communicate with a radio access network (RAN) and setting a core network data rate based on the network data rate to communicate with a core network.

According to one of the exemplary embodiments, the disclosure is directed to a base station which includes not limited to a transmitter, a receiver, and a processor coupled to the transmitter and the receiver and configured at least to: receiving, via the receiver, a connection establishment message which comprises an identification (ID) of the UE and a network ID; receiving, via the receiver, a first data rate configuration message including a first data rate class ID, a plurality of network data rates which is associated with the network ID as each data rate corresponds to a different data rate class ID, and a radio access network (RAN) rate which is associated with the network ID; transmitting, via the transmitter, a second data rate configuration which includes the first data rate class ID and the network data rate which is associated with the network ID; and providing a first data rate based on the first data rate class ID.

In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
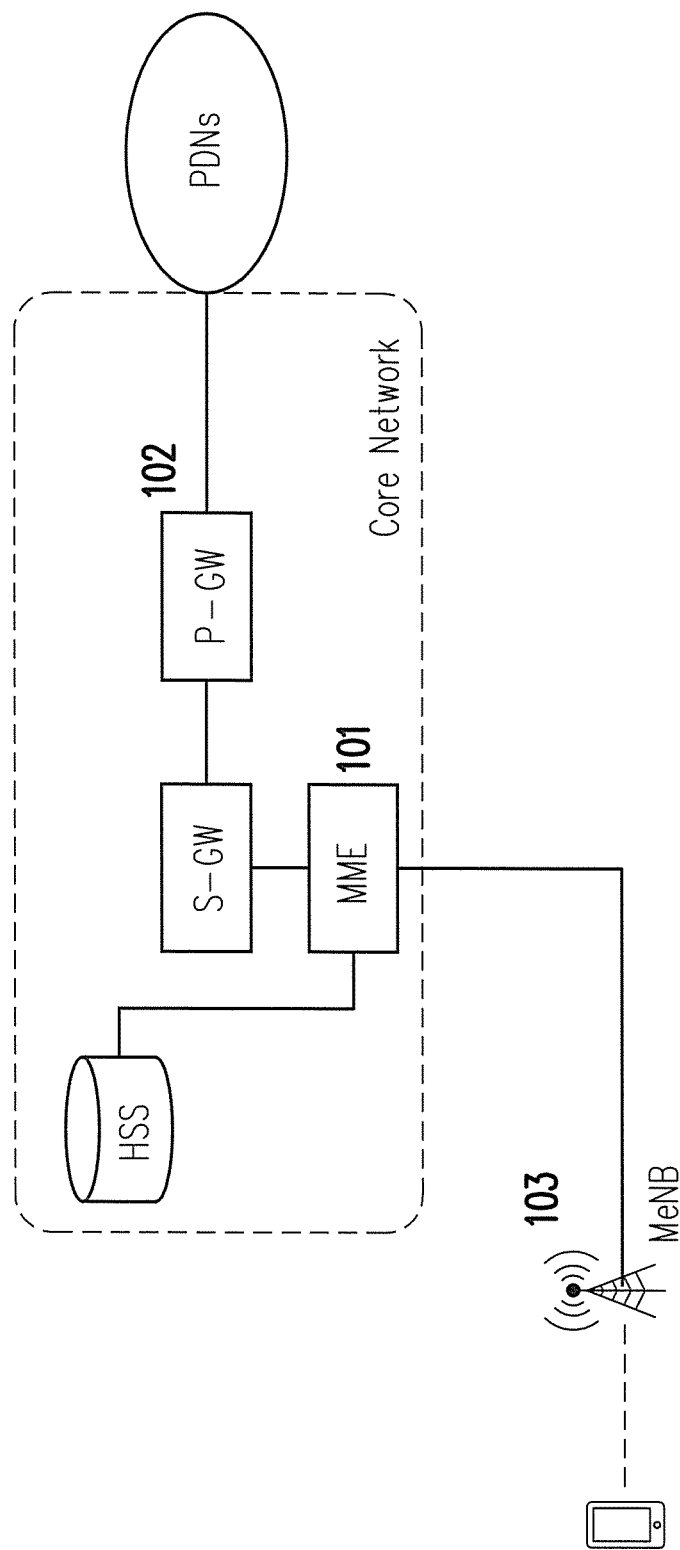
FIG. 1 illustrates a reference network architecture of a communication system.
Figure 2:
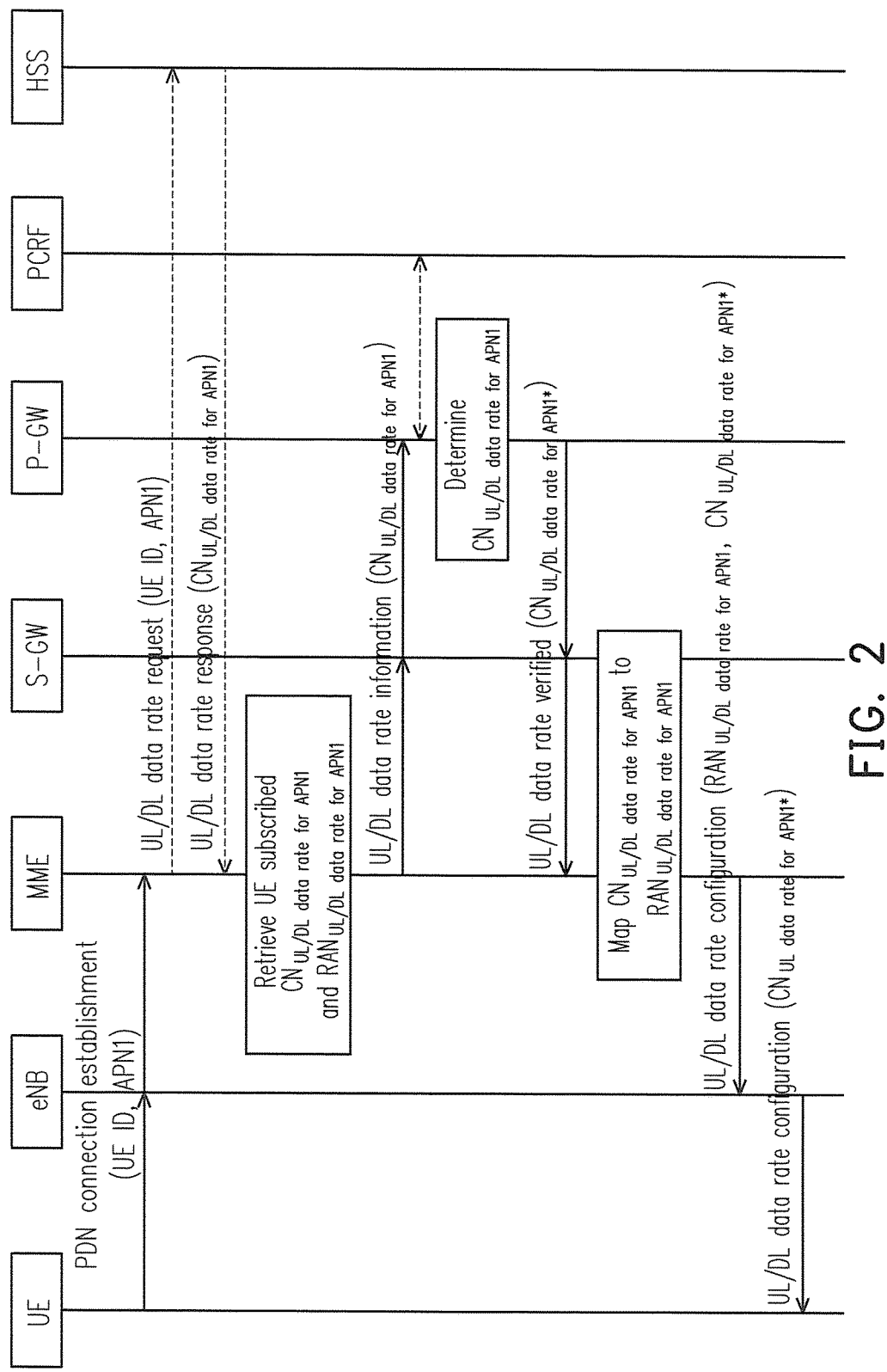
FIG. 2 illustrates a signaling diagram for configuring the maximum data rate by a communication system.
Figure 3:
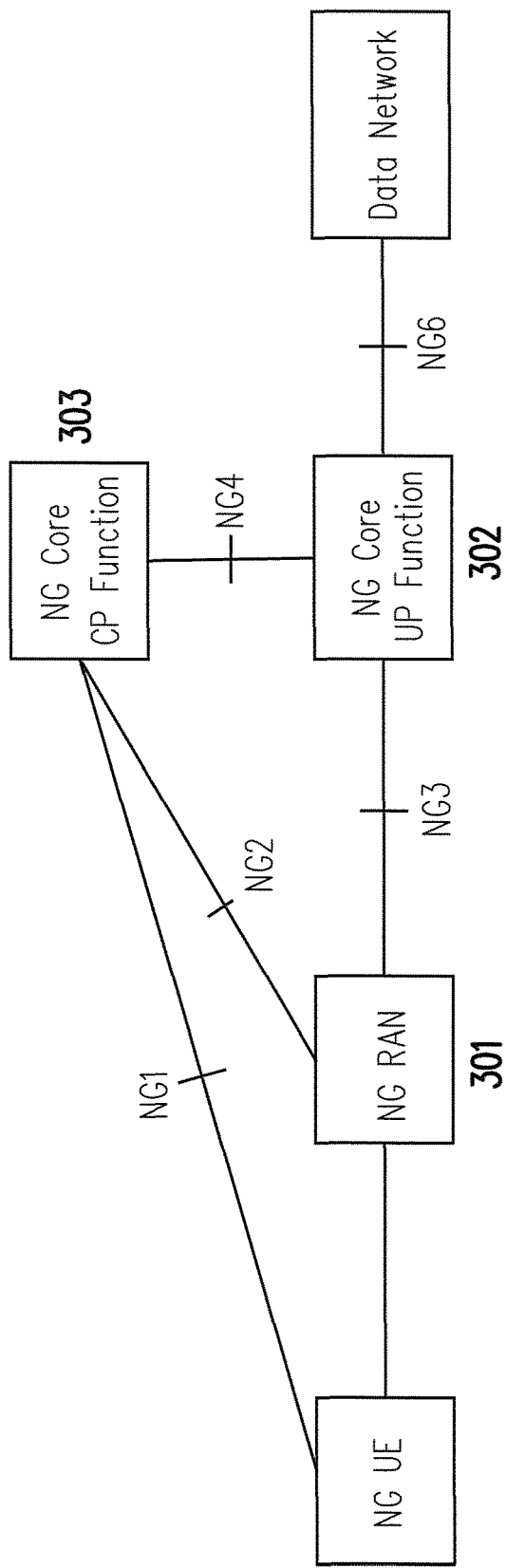
FIG. 3 illustrates a reference network architecture from the perspective of a control plane as defined by 3GPP TR 23.799.

Reference will now be made in detail to the present exemplary embodiments of the disclosure, examples of which are illustrated in the accompanying drawings. Wherever possible, the same reference numbers are used in the drawings and the description to refer to the same or like parts.

The disclosure provides a mechanism to adjust the max data rate of RAN and CN based on the available radio resources that could be provided for a UE. The mechanism would adjust the maximum data rate of CN to reflect the increase or decrease of available radio resource that could be provided for a UE in order to enlarge the throughput per UE per time unit. The mechanism would not adversely impact the CN with signalling storms since the radio resources available for a UE could potentially change drastically and with great frequency.

In general, the eNB may initiate a modification for the max data rate which would be arranged into multiple classes. Each class could be defined and configured by the core network according to, for example, the operator policy in order to reflect the radio resources that are available for a UE. The available of radio resources could be a function of various factors such as the radio access technology (RAT), a combination of different RATs, a number of aggregated carriers, an available bandwidth, whether spectrum is licensed or unlicensed, and so forth. A UE may apply only one maximum data rate class (e.g., MBR class_1 in 500 megabytes per second (Mbps)) for both RAN and CN at a time. The RAN and CN would apply the same maximum data rate class. An eNB would be allowed to initiate the modification of maximum data rate class applied by the CN and RAN autonomously.

To implement the above described concept, the disclosure provides various exemplary embodiments. According to one of the exemplary embodiments, the maximum data rate would be arranged into multiple classes. A UE may only apply a maximum data rate class for both RAN (e.g., RAN Max data rate class_1=500 mbps) and CN (e.g., CN Max data rate class_1=500 mbps) at a time. The UE, RAN (e.g., eNB), CN_CP (e.g., MME) would maintain the value of one or more RAN maximum data rate classes (per UE). The CN_CP (e.g., MME) and the CN_UP (e.g., S-GW, P-GW) would maintain the values of one or more CN maximum data rate classes for each active UE.

According to one of the exemplary embodiments, eNB would initiate modification of the currently applied RAN and CN maximum data rate class for a UE. An eNB may initiate the maximum UL/DL data rate adjustment when, for example, the average downlink data rate of RAN is approximately the same as the downlink aggregate maximum bit rate (AMBR) of the UE and the downlink data rate of the CN is approximately the same as the downlink AMBR of an access point name (APN) and the average downlink packet buffering time is close to zero. Another criteria for the eNB to initiate the maximum UL/DL data rate adjustment could be, for example, when the average uplink data rate of the RAN is approximately the same as the uplink AMBR of the UE and the buffer status report (BSR) is greater than a threshold; and the uplink buffer size is greater than threshold$_j$ and average uplink packet buffer time is greater than threshold$_k$.

According to one of the exemplary embodiments, the maximum data rate modification could be UE assisted. The eNB may take UE preference into account such as whether the UE would prefer unlicensed component carriers (CCs). The eNB may also take UE statistical information into account rather than only considering the UE measurement report. The UE may report through a specific access node in licensed or unlicensed spectrum to report UL error/re-transmission rate, mobility state, average number of attempts before successfully accessing a CC/access node, and etc. The eNB may collect information with regard to the throughput and the DL error/retransmission rate through a specific access node in the licensed or unlicensed spectrum. According to one of the exemplary embodiments, the eNB may report traffic volume to a core network.

Figure 4A:
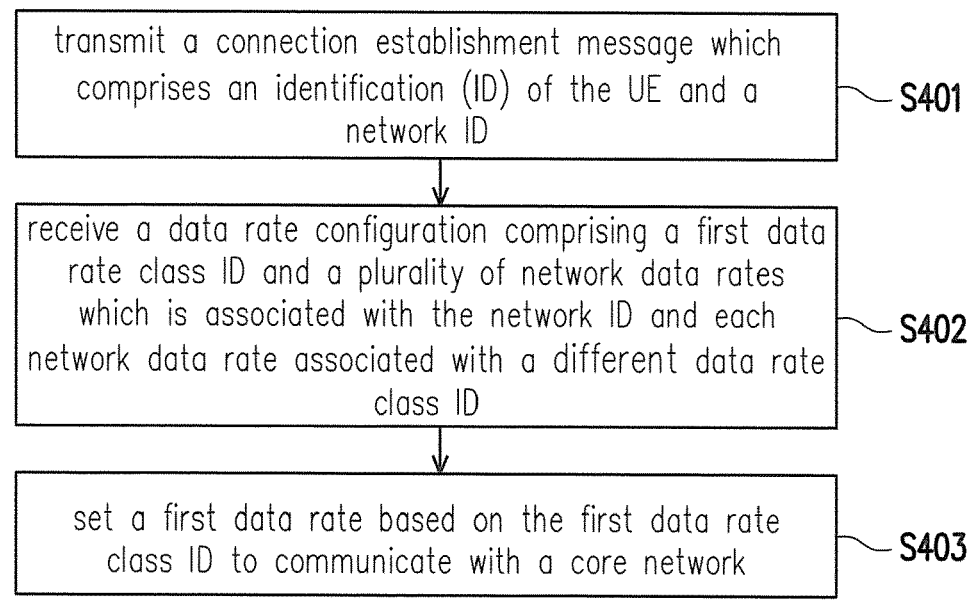
FIG. 4A illustrates a data rate modification method from the perspective of a UE in accordance with one of the exemplary embodiments of the disclosure.

FIG. 4A illustrates a data rate modification method from the perspective of a UE in accordance with one of the exemplary embodiments of the disclosure. In step S401, the UE may transmit a connection establishment message which has an identification (ID) of the UE and a network ID. The connection establishment message could be a PDN connection establishment message and the network ID could be an APN ID which identifies the identity of the APN for the PDN connection to be established. In step S402, the UE would receive a data rate configuration which has a first data rate class ID and a plurality network data rates which is associated with the network ID. The first data rate class ID could be mapped to an ID of a plurality of IDs as each ID would be mapped to a different data rate. The UE, the eNB, and the network would have a common understanding of the data rate class IDs. The data rate configuration may configure a maximum UL data rate or a maximum DL data rate. In step S403, the UE would set a first data rate based on the first data rate class ID to communicate with a core network having a data rate based on the network data rate to communicate with a core network.

Figure 4B:
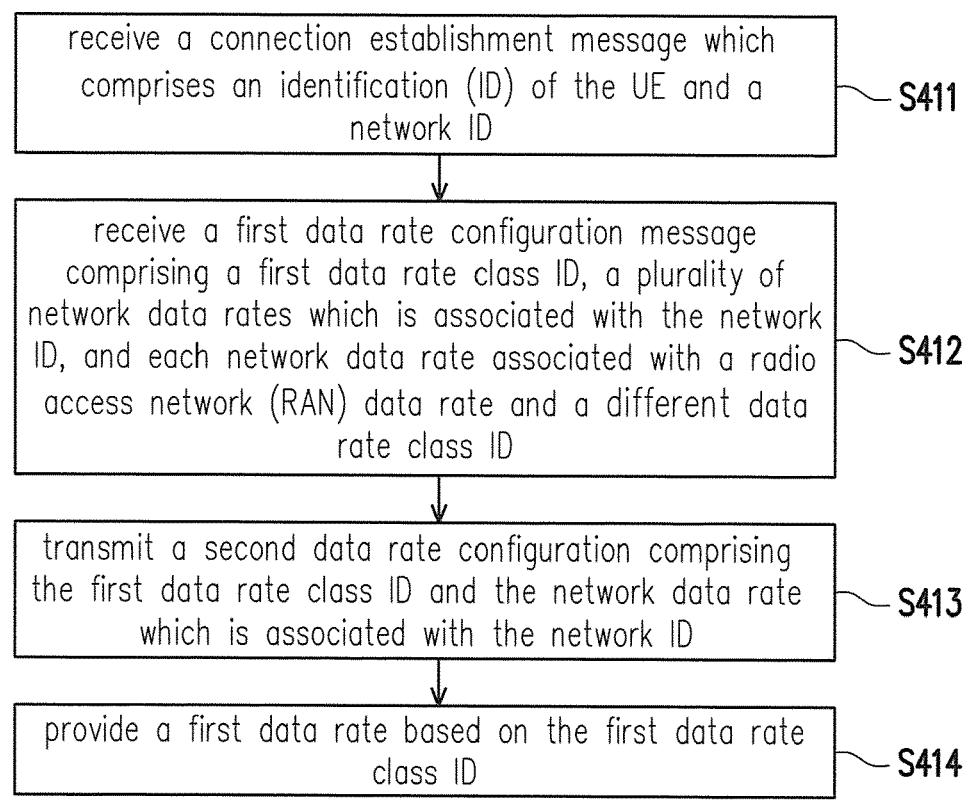
FIG. 4B illustrates a data rate modification method from the perspective of a base station in accordance with one of the exemplary embodiments of the disclosure.

FIG. 4B illustrates a data rate modification method from the perspective of a base station in accordance with one of the exemplary embodiments of the disclosure. In step S411, the base station would receive a connection establishment message which has an identification (ID) of the UE and a network ID. In step S412, the base station would receive a first data rate configuration message which has a first data rate class ID, a plurality of core network data rate which is associated with the network ID as each network data rate is associated with a different radio access network (RAN) rate and a different network ID. In step S413, the base station would transmit a second data rate configuration which has the first data rate class ID and the network data rate which is associated with the network ID. In step S414, the base station would provide a first data rate based on the first data rate class ID.

Figure 4C:
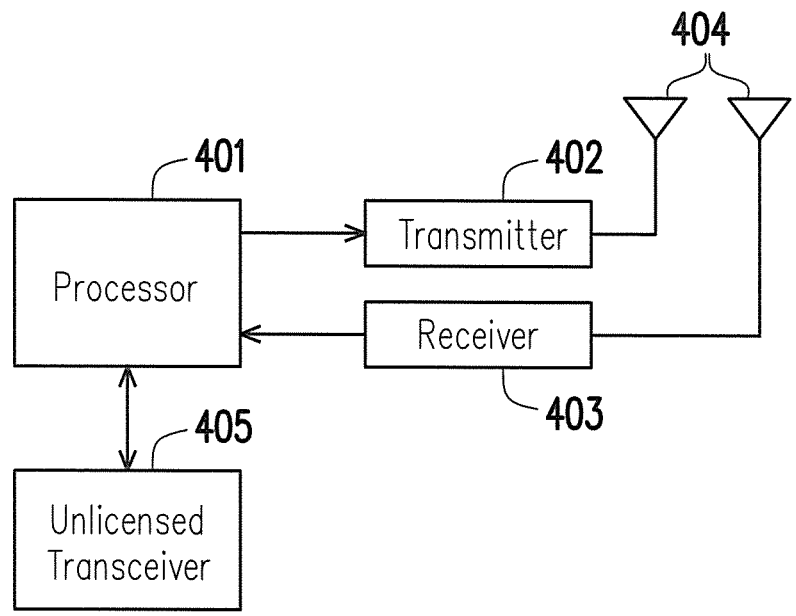
FIG. 4C illustrates the hardware diagram of a UE in terms of functional block diagrams in accordance with one of the exemplary embodiments of the disclosure.

FIG. 4C illustrates the hardware diagram of a UE in terms of functional block diagrams in accordance with one of the exemplary embodiments of the disclosure. The term "user equipment" (UE) in this disclosure may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and the like. In some applications, a UE may be a fixed computer device operating in a moving environment, such as a bus, a train, an airplane, a boat, a car, and so forth.

The exemplary user equipment may include not limited to a processor 401 coupled to a transmitter 402, a receiver 403, an antenna array 404, and an unlicensed band transceiver. The transmitter 402 and receiver 403 could be configured to operate in the radio frequency or millimeter wave (mm-Wave) frequency and may also perform operations such as low noise amplifying, impedance matching, frequency mixing, up or down frequency conversion, filtering, amplifying, and so forth. The transmitter 402 and receiver 403 may each include one or more analog-to-digital (A/D) and digital-to-analog (D/A) converters which are configured to convert from a digital signal format to an analog signal format during uplink signal processing and from an analog signal format to digital signal format during downlink signal processing. The antenna array 404 includes multiple antennas which would transmit and receive omni-directional beams or directional antenna beams. The unlicensed band transceiver 405 contains one or more transceivers for communicating in the unlicensed spectrum. The unlicensed band transceiver 405 could be, for example, WiFi, NFC, or Bluetooth transceiver.

The processor 401 is configured to process digital signals and to perform procedures of the proposed method of network slicing in accordance with the proposed exemplary embodiments of the disclosure. Also, the processor 401 may access to a non-transitory storage medium which stores programming codes, codebook configurations, buffered data, or record configurations assigned by the processor 401. The processor 401 could be implemented by using programmable units such as a micro-processor, a micro-controller, a DSP chips, FPGA, etc. The functions of the processor(s) may also be implemented with separate electronic devices or ICs. It should be noted that the functions of processor 401 may be implemented with either hardware or software.

Figure 4D:
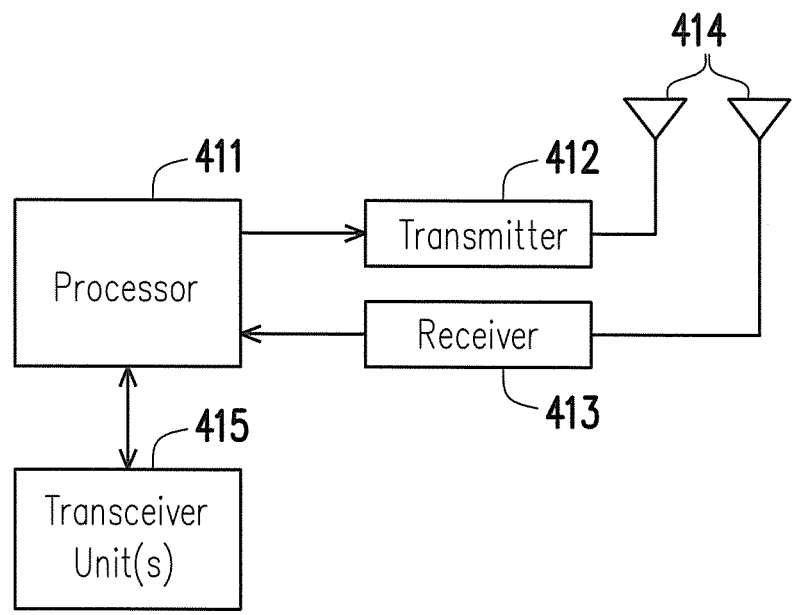
FIG. 4D illustrates the hardware diagram of a base station in terms of functional block diagrams in accordance with one of the exemplary embodiments of the disclosure.

FIG. 4D illustrates the hardware diagram of a base station in terms of functional block diagrams in accordance with one of the exemplary embodiments of the disclosure. The term base station (BS) in this disclosure could be synonymous, for example, with a variation or a sub-variation of an "eNodeB" (eNB), a Node-B, an advanced base station (ABS), a base transceiver system (BTS), an access point, a home base station, a relay station, a scatterer, a repeater, an intermediate node, an intennediary, satellite-based communication base stations, and so forth.

The exemplary base station may include not limited to a processor 411 coupled to a transmitter unit 412, a receiver unit 413, an antenna array 414, and a transceiver unit 415.

The transmitter unit 412 and receiver unit 413 could be one or more transmitters/receivers configured to transmit and receive signals respectively in the radio frequency or in the mmWave frequency. The transmitter 412 and receiver 413 may also perform operations such as low noise amplifying, impedance matching, frequency mixing, up or down frequency conversion, filtering, amplifying, and so forth. The transmitter 412 and receiver 413 may each include one or more analog-to-digital (A/D) and digital-to-analog (D/A) converters which are configured to convert from an analog signal format to a digital signal format during uplink signal processing and from a digital signal format to an analog signal format during downlink signal processing. The antenna array 414 may include multiple antennas which would transmit and receive omni-directional antenna beams or directional antenna beams.

The processing unit 411 is configured to process digital signals and to perform procedures of the proposed method of network slicing in accordance with the proposed exemplary embodiments of the disclosure. Also, the processing unit 411 may access to a non-transitory storage medium which stores programming codes, codebook configurations, buffered data, or record configurations assigned by the processing unit 411. The processing unit 411 could be implemented by using programmable units such as a micro-processor, a micro-controller, a DSP chips, FPGA, etc. The functions of the processing unit 1001 may also be implemented with separate electronic devices or ICs. It should be noted that the functions of processing unit 411 may be implemented with either hardware or software.

Figure 5:
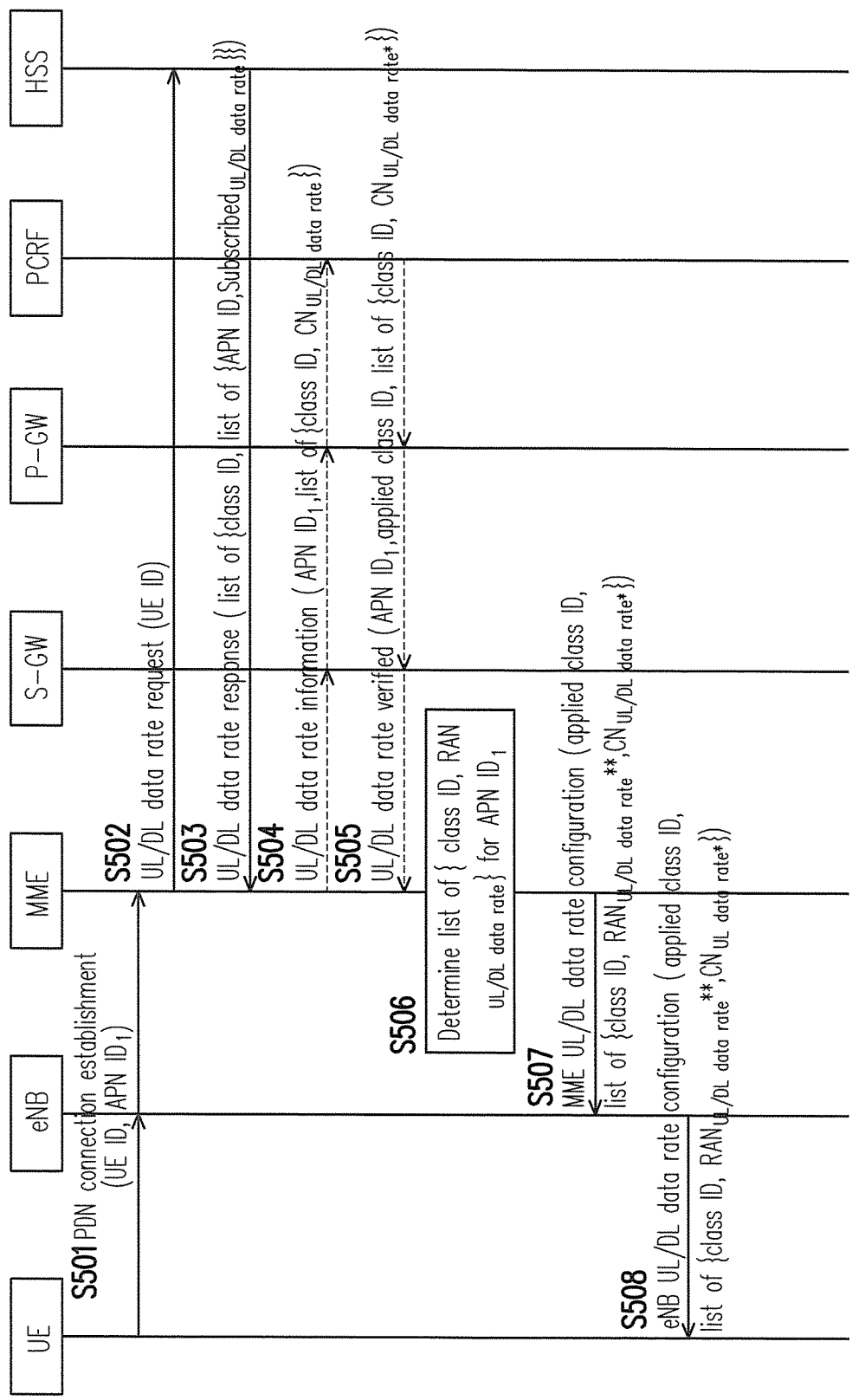
FIG. 5 illustrates a signaling diagram for configuring UL/DL data rate classes in accordance with a first exemplary embodiment of the disclosure.

FIG. 5~FIG. 13 and their corresponding written descriptions will further elucidate the aforementioned concepts with further details. FIG. 5 illustrates a signaling diagram for configuring UL/DL data rate classes in accordance with a first exemplary embodiment of the disclosure. In step S501, the UE may transmit to an eNB a PDN connection establishment message which may include not limited to a UE ID and a APN ID. The PDN connection establishment message could be one of a PDN Connectivity Request message, an Attach Request message, a Tracking Area Update Request message, a Service Request message, and a new message. UE ID would be the identity of a UE such as P-TMSI, GUTI, IMSI, and etc. The APN ID would be the identity of the APN for the PDN connection to be established. When the eNB (i.e., an E-UTRAN access node) receives a PDN connection establishment message from a UE, the eNB may determine a MME based on the information elements in the PDN connection establishment message. The eNB would forward the PDN connection establishment message to the MME.

In response to receiving the PDN connection establishment message from an eNB, in step S502, the MME would send a UL/DL data rate request message to home subscriber service (HSS) to query for UE context if there is no corresponding UE context in the MME. The UL/DL data rate request message may include not limited to one or more of a UE ID, an APN ID which is the identity of the APN for the PDN connection to be established. In response to receiving the UL/DL data rate request message, in step S503, the HSS may transmit a UL/DL data rate response to the MME which would maintain the information carried in the UL/DL data rate response message. The UL/DL data rate response message may include not limited to: one of a list of one or more information (set_A1), each information set_A1 may include not limited to: a class ID which is the identity of a data rate class (e.g., an AMBR class ID) and a list of one or more information set_B1, each information set_B1 may include not limited to: at least one of APN ID which identifies an APN, Subscribed$_{UL\ data\ rate}$ which is the corresponding value of the subscribed maximum UL data rate associated with the class ID and associates with the specific APN which is identified by the APN ID, Subscribed$_{DL\ data\ rate}$ which is the corresponding value of the subscribed maximum DL data rate associated with the class ID and associates with the specific APN which is identified by the APN ID.

In response to receiving the UL/DL data rate response message, in step S504, the MME may send a UL/DL data rate information message to a S-GW and the S-GW may send a UL/DL data rate information message to a P-GW and the UL/DL data rate information messages may include the information elements not limited to an APN ID, a suggested class ID which indicates the data rate class that the MME suggested to be applied to the PDN connection associated with the APN ID, and a list of one or more information set_C1. Each information set_C1 may include the information elements not limited to a class ID to identify the data rate class, CN$_{UL\ data\ rate}$ which is the corresponding value of the CN UL data rate, and CN$_{DL\ data\ rate}$ which is the corresponding value of the CN DL data rate. The P-GW which received the UL/DL data rate information message may forward the information to a Policy and Charging Rules Function (PCRF).

In response to the P-GW and/or PCRF receiving the UL/DL data rate information message, the P-GW and/or PCRF may determine a list of one or more information set_D1 according to the information elements in the received UL/DL data rate information message. In step S505, the P-GW and/or PCRF may send a UL/DL data rate verified message with the determined applied class ID and the determined list of one or more information set_D1 to the S-GW and the S-GW may send a UL/DL data rate verified message with the determined applied class ID and the determined list of one or more information set D_1 to the MME from which the UL/DL data rate information message was received. Each information set_D1 may include one or more of the following information elements not limited to: a class ID, CN$_{UL\ data\ rate}$ (for the same associated class ID, this value could be different from the value of CN$_{UL\ data\ rate}$ in UL/DL data rate information message), and CN$_{DL\ data\ rate}$ (for the same associated class ID, this value could be different from the value of CN$_{DL\ data\ rate}$ in UL/DL data rate information message).

In response to receiving the UL/DL data rate verified, in step S506, the MME should determine a list of information set_E1, and each information set_E1 may include one or more of the following information elements not limited to:

a class ID, $RAN_{UL\ data\ rate}$ which is the corresponding value of RAN UL data rate for the APN ID indicated in the corresponding PDN connection establishment message, and $RAN_{DL\ data\ rate}$ which is the corresponding value of RAN DL data rate for the APN ID indicated in the corresponding PDN connection establishment message. In step S507, the MME would send an MME UL/DL data rate configuration message to the eNB. The MME UL/DL data rate configuration message may include the following information not limited to an applied class ID and a list of one or more information set_F1, each information set_F1 may include one or more of the following information elements not limited to a class ID, $RAN_{UL\ data\ rate}$ which is the value of RAN UL data rate for the APN ID indicated in the corresponding PDN connection establishment message, $RAN_{DL\ data\ rate}$ which is the value of RAN DL data rate for the APN ID indicated in the corresponding PDN connection establishment message, $CN_{UL\ data\ rate}$ which is the value of CN UL data rate for the APN ID indicated in the corresponding PDN connection establishment message, and $CN_{DL\ data\ rate}$ which is the value of CN DL data rate for the APN ID indicated in the corresponding PDN connection establishment message. The $CN_{UL\ data\ rate}$ and $CN_{DL\ data\ rate}$ may not be included as information of a non-access stratum (NAS) message that is transmitted via the eNB to a UE by an access stratum (AS) message.

When an eNB receives an MME UL/DL data rate configuration message from the MME, the eNB may maintain the information of the information set_F1. In step S508, the eNB would send an eNB UL/DL data rate configuration message to the UE, may include the information elements not limited to: a applied class ID, a list of one or more information set_G1, each information set_G1 may include one or more of the following information elements not limited to: a class ID which is the value of the information element should be identical to the value of the class ID in the information set_H1, $RAN_{UL\ data\ rate}$ which is the value of RAN UL data rate for the APN ID indicated in the corresponding PDN connection establishment message, $RAN_{DL\ data\ rate}$ which is the value of RAN DL data rate for the APN ID indicated in the corresponding PDN connection establishment message, $CN_{UL\ data\ rate}$ which is the value of CN UL data rate for the APN ID indicated in the corresponding PDN connection establishment message, and $CN_{DL\ data\ rate}$ which is the value of CN DL data rate for the APN ID indicated in the corresponding PDN connection establishment message. The $CN_{UL\ data\ rate}$ and $CN_{DL\ data\ rate}$ may not be included as information of an access stratum (AS) message but be included as information of a non-access stratum (NAS) message that is carried by the AS message. In response to receiving the eNB UL/DL data rate configuration message from eNB, the UE may maintain the information of the information set_G1. The UE may apply the applied class ID and the corresponding data rate configuration as indicated in the eNB UL/DL data rate configuration message.

Figure 6:
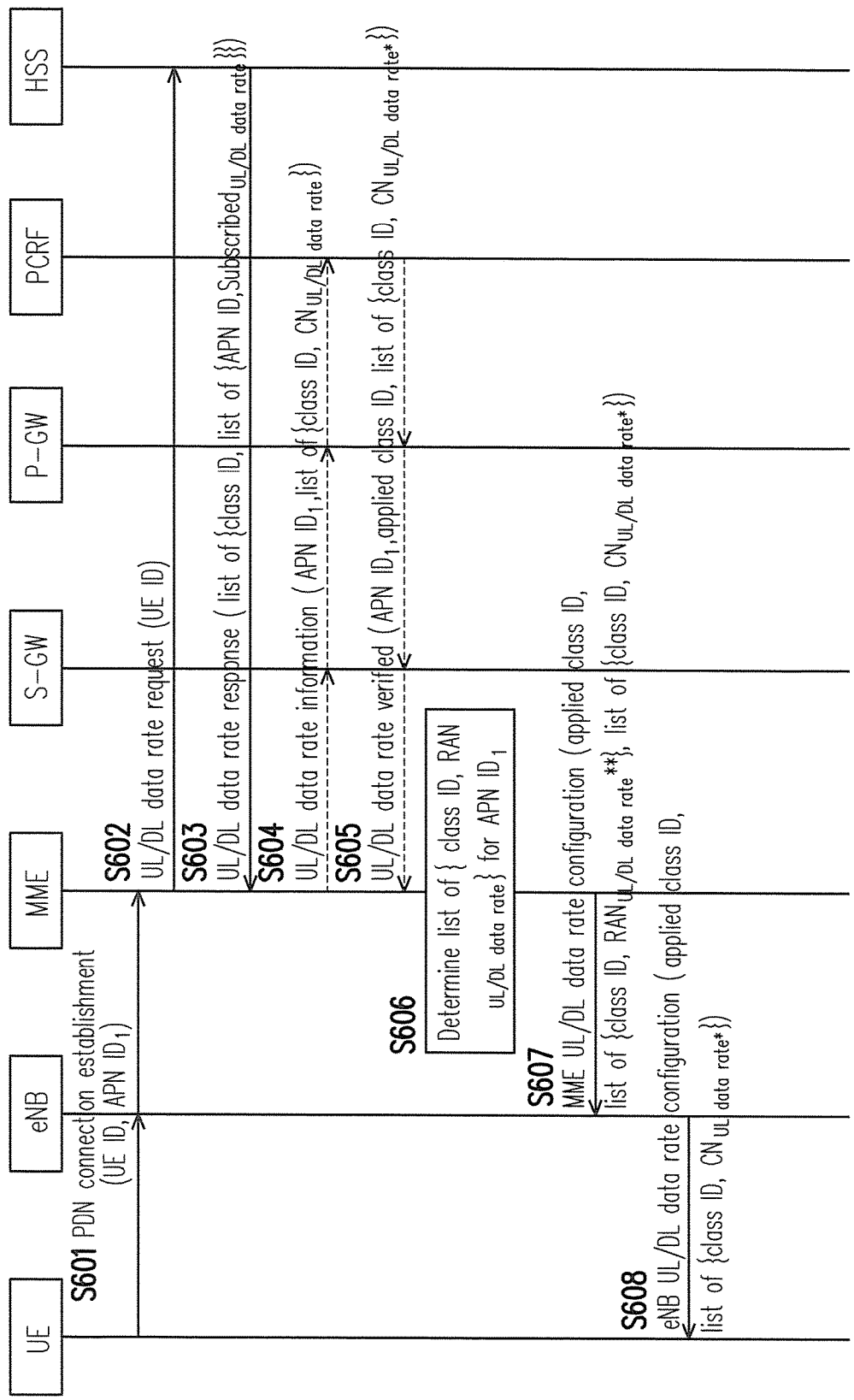
FIG. 6 illustrates a signaling diagram for configuring UL/DL data rate classes in accordance with a second exemplary embodiment of the disclosure.

FIG. 6 illustrates a signaling diagram for configuring UL/DL data rate classes in accordance with a second exemplary embodiment of the disclosure. In step S601, a UE would initiate a new PDN connection to a APN (e.g., APN1) by transmitting a PDN connection establishment message an eNB. The PDN connection establishment message could be one of a PDN Connectivity Request message, an Attach Request message, a Tracking Area Update Request message, a Service Request message, a new message, and etc. The PDN connection establishment message may include the following information elements not limited to a UE ID which is the identity of the UE (e.g., P-TMSI, GUTI, IMSI) and an APN ID which is the identity of the APN for the PDN connection to be established. In response to receiving the PDN connection establishment message from the UE, the eNB may determines a MME based on the information elements in the PDN connection establishment message and subsequently forward the PDN connection establishment message to the MME.

In response to receiving the PDN connection establishment message from an eNB, in step S602, if there is no corresponding UE context in the MME, the MME may transmit a UL/DL data rate request message to a HSS to query for UE context. The UL/DL data rate request message may include the following information elements not limited to the UE ID and an APN ID which is the identity of the APN for the PDN connection to be established. In step S603, the MME may receive from the HSS a UL/DL data rate response message and may maintain the information carried within the UL/DL data rate response message. The UL/DL data rate response message may include the following information elements not limited to: a list of one or more information set_A2, each information set_A2 may include one or more of the following information elements not limited to: a class ID which is the identity of a data rate class (e.g., an AMBR class ID) and a list of one or more information set_B2, each information set_B2 may include one or more of the following information elements not limited to: an APN ID which identifies an APN, $Subscribed_{UL\ data\ rate}$ which is the corresponding value of the subscribed maximum UL data rate associated with the class ID and associates with the specific APN which is identified by the APN ID, and $Subscribed_{DL\ data\ rate}$ which is the corresponding value of the subscribed maximum DL data rate associated with the class ID and associates with the specific APN which is identified by the APN ID.

In response to receiving the UL/DL data rate response message, in step S604, the MME may transmit to a S-GW and the S-GW may send a UL/DL data rate information message to a P-GW an UL/DL data rate information message and the UL/DL data rate information messages may include the information elements not limited to: APN ID which is the identity of the APN for the PDN connection to be established, a suggested class ID: which indicates the data rate class that the MME suggested to be applied to the PDN connection associated with the APN ID, and a list of one or more information set_C2, each information set_C2 may include the information elements not limited to a class ID which identifies the data rate class, $CN_{UL\ data\ rate}$ which is the corresponding value of the CN UL data rate, and $CN_{DL\ data\ rate}$ which is the corresponding value of the CN DL data rate. The P-GW which received the UL/DL data rate information message may forward the information to a PCRF.

In response to receiving the UL/DL data rate information message, the P-GW and/or PCRF may determine a list of one or more information set_D2 according to the information elements in the received UL/DL data rate information message. In step S605, the P-GW and/or PCRF may transmit a UL/DL data rate verified message with the determined applied class ID and the determined list of one or more information set_D2 to the S-GW and the S-GW may send a UL/DL data rate verified message with the determined applied class ID and the determined list of one or more information set_D2 to the MME from which the UL/DL data rate information message has been received. Each information set_D2 may include the determined applied class ID and one or more of the following information elements not limited to: a class ID, $CN_{UL\ data\ rate}$ (though for the same associated class ID, this value could be different from the value of $CN_{UL\ data\ rate}$ in UL/DL data rate information message), and $CN_{DL\ data\ rate}$ (though for the same associated class ID, this value could be different from the value of $CN_{DL\ data\ rate}$ in UL/DL data rate information message).

In response to receiving the UL/DL data rate verified message from the P-GW, in step S606, the MME would determine a list of information set_F2, each information set_F2 may include one or more of the following information elements not limited to: a class ID, $RAN_{UL\ data\ rate}$ which is the corresponding value of RAN UL data rate for the APN ID indicated in the corresponding PDN connection establishment message, and $RAN_{DL\ data\ rate}$ which is the corresponding value of RAN DL data rate for the APN ID indicated in the corresponding PDN connection establishment message. In step S607, the MME would transmit an MME UL/DL data rate configuration message to the same eNB that has sent the PDN connection establishment message. The MME UL/DL data rate configuration message may include the following information not limited to an applied class ID and a list of one or more information set_G2, each information set_G2 may include one or more of the following information elements not limited to: a class ID, $RAN_{UL\ data\ rate}$ which is the value of RAN UL data rate for the APN ID indicated in the corresponding PDN connection establishment message, $RAN_{DL\ data\ rate}$ which is the value of RAN DL data rate for the APN ID indicated in the corresponding PDN connection establishment message and a list of one or more information set_H2, each information set_H2 may include one or more of the following information elements not limited to a class ID, $CN_{UL\ data\ rate}$ which is the value of CN UL data rate for the APN ID indicated in the corresponding PDN connection establishment message, and $CN_{DL\ data\ rate}$ which is the value of CN DL data rate for the APN ID indicated in the corresponding PDN connection establishment message. The $CN_{UL\ data\ rate}$ and $CN_{DL\ data\ rate}$ may not be included as information of a non-access stratum (NAS) message that is transmitted via the eNB to a UE by an access stratum (AS) message.

In response to receiving the MME UL/DL data rate configuration message from the MME, the eNB would maintain the information of the information set_G2 and transmits an eNB UL/DL data rate configuration message to the UE. The eNB UL/DL data rate configuration may include the information elements not limited to: an applied class ID and a list of one or more information set_I2, each information set_I2 may include one or more of the following information elements not limited to: a class ID which is the value of the information element should be identical to the value of the class ID in the information set_H, $RAN_{UL\ data\ rate}$ which is the value of RAN UL data rate for the APN ID indicated in the corresponding PDN connection establishment message, $RAN_{DL\ data\ rate}$ which is the value of RAN DL data rate for the APN ID indicated in the corresponding PDN connection establishment message, $CN_{UL\ data\ rate}$ which is the value of CN UL data rate for the APN ID indicated in the corresponding PDN connection establishment message, and $CN_{DL\ data\ rate}$ which is the value of CN DL data rate for the APN ID indicated in the corresponding PDN connection establishment message. When the UE receives the eNB UL/DL data rate configuration message from eNB, the UE would maintain the information of the information set_I2. The UE may apply the applied class ID and the corresponding data rate configuration as indicated in the eNB UL/DL data rate configuration message.

Figure 7:
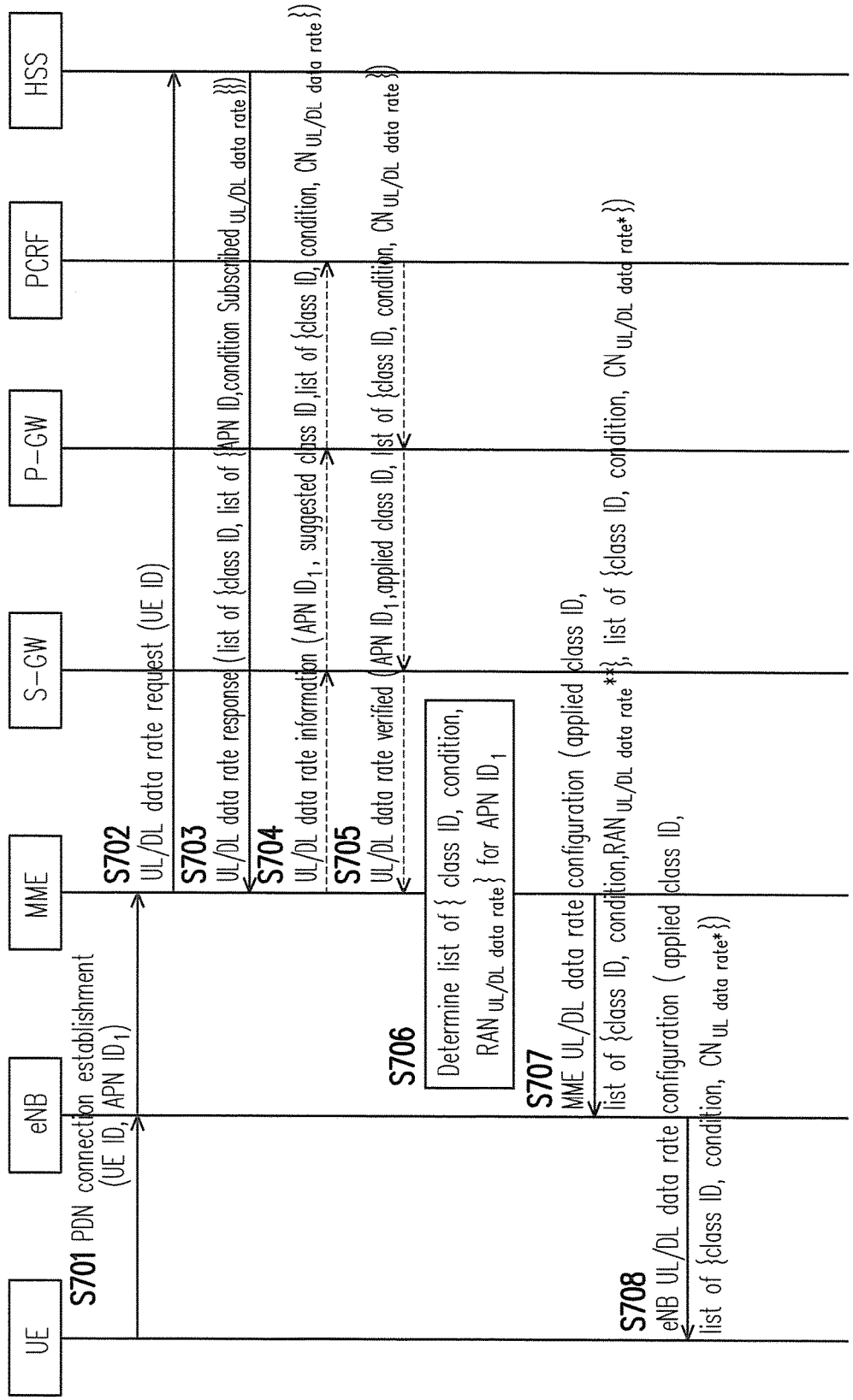
FIG. 7 illustrates a signaling diagram for configuring UL/DL data rate classes for licensed/unlicensed resources in accordance with a third exemplary embodiment of the disclosure.

FIG. 7 illustrates a signaling diagram for configuring UL/DL data rate classes for licensed/unlicensed resources in accordance with a third exemplary embodiment of the disclosure. In step S701, a UE may initiate a new PDN connection to an APN by transmitting a PDN connection establishment message to an eNB. The PDN connection establishment message could be one of a PDN Connectivity Request message, an Attach Request message, a Tracking Area Update Request message, a Service Request message, a new message, and etc. The PDN connection establishment message may include the following information elements not limited to: a UE ID which is the identity of the UE (e.g., P-TMSI, GUTI, IMSI) and an APN ID which the identity of the APN for the PDN connection to be established. In response to receiving the PDN connection establishment message from the UE, the eNB would determine a MME based on the information elements in the PDN connection establishment message. The eNB may then forward the PDN connection establishment message to the MME.

In response to receiving a PDN connection establishment message from an eNB, in step S702, the MME may transmit a UL/DL data rate request message to HSS to query for UE context if there is no corresponding UE context in the MME. The UL/DL data rate request message may include the following information elements not limited to the UE ID and an APN ID which the identity of the APN for the PDN connection to be established. In step S703, the MME may receive a UL/DL data rate response message from the HSS. The MME may maintain the information carried in the UL/DL data rate response message. The UL/DL data rate response message may include the following information elements not limited to: a list of one or more information set_A3, each information set_A3 may include one or more of the following information elements not limited to: a class ID which the identity of a data rate class (e.g., an AMBR class ID), a list of one or more information set_B3, each information set_B3 may include one or more of the following information elements not limited to: an APN ID which identifies an APN, a condition which indicates the condition that the information set_B is available, $Subscribed_{UL\ data\ rate}$ which is the corresponding value of the subscribed maximum UL data rate associated with the class ID and associates with the specific APN which is identified by the APN ID, and $Subscribed_{DL\ data\ rate}$ which is the corresponding value of the subscribed maximum DL data rate associated with the class ID and associates with the specific APN which is identified by the APN ID. For example, if the condition indicates "licensed", then "licensed" would indicate that information set_B3 is applicable when all radio resource is over licensed spectrum. On the other hand, if the condition indicates "unlicensed", then "unlicensed" would indicate that information set_B3 is applicable when any radio resource over unlicensed spectrum is utilized.

In response to receiving the UL/DL data rate response message, in step S704, the MME may transmit a UL/DL data rate information message to a S-GW and the S-GW may send a UL/DL data rate information message to a P-GW, the UL/DL data rate information messages may include the information elements not limited to: an APN ID which is the identity of the APN for the PDN connection to be established and a suggested class ID: which indicates the data rate class that the MME suggested to be applied to the PDN connection associated with the APN ID, and a list of one or more information set_C3, each information set_C3 may include the information elements not limited to: a class ID which identifies the data rate class, a condition which indicates the condition that the information set_C3 is available, $CN_{UL\ data\ rate}$ which is the corresponding value of the CN UL data rate, and $CN_{DL\ data\ rate}$ which is the corresponding value of the CN DL data rate. For example, if the condition indicates "licensed", then "licensed" would indicate that information set_C3 is applicable when all radio resource is over licensed spectrum. On the other hand, if the condition indicates "unlicensed", then "unlicensed" would indicate that information set_C3 is applicable when any radio resource over unlicensed spectrum is utilized. In response to receiving the UL/DL data rate information message, the P-GW may forward the information to a PCRF.

In response to receiving the UL/DL data rate information message, the P-GW and/or PCRF may determine a list of one or more information set_D3 according to the information elements in the received UL/DL data rate information message. In step S705, the P-GW and/or PCRF may transmit a UL/DL data rate verified message with the determined applied class ID and the determined list of one or more information set_D3 to the S-GW and the S-GW may send a UL/DL data rate verified message with the determined applied class ID and the determined list of one or more information set D_1 to the MME from which the UL/DL data rate information message was received. Each information set_D3 may include one or more of the following information elements not limited to: a class ID, a condition which indicates the condition that the information set_D3 is available. $CN_{UL\ data\ rate}$ (though for the same associated class ID, this value could be different from the value of $CN_{UL\ data\ rate}$ in UL/DL data rate information message), and $CN_{DL\ data\ rate}$ (though for the same associated class ID, this value could be different from the value of $CN_{DL\ data\ rate}$ in UL/DL data rate information message). For example, if the condition indicates "licensed", then "licensed" would indicate that information set_D3 is applicable when all radio resource is over licensed spectrum. On the other hand, if the condition indicates "unlicensed", then "unlicensed" would indicate that information set_D3 is applicable when any radio resource over unlicensed spectrum is utilized.

In response to receiving the UL/DL data rate verified message from the P-GW, in step S706, the MME would determine a list of information set_F3, each information set_F3 may include one or more of the following information elements not limited to: a class ID, a condition which indicates the condition that the information set_F3 is available, $RAN_{UL\ data\ rate}$ which is the corresponding value of RAN UL data rate for the APN ID indicated in the corresponding PDN connection establishment message, and $RAN_{DL\ data\ rate}$ which is the corresponding value of RAN DL data rate for the APN ID indicated in the corresponding PDN connection establishment message. For example, if condition indicates "licensed", then "licensed" would indicate that information set_F3 is applicable when all radio resource is over licensed spectrum. On the other hand, if condition indicates "unlicensed", then "unlicensed" would indicate that information set_F3 is applicable when any radio resource over unlicensed spectrum is utilized.

In step S707, the MME would transmit an MME UL/DL data rate configuration message to the same eNB that has sent the PDN connection establishment message. The MME UL/DL data rate configuration message may include the following information not limited to: an applied class ID and a list of one or more information set_G3, each information set_G3 may include one or more of the following information elements not limited to a class ID, a condition which indicates the condition that the information set_G3 is available, $RAN_{UL\ data\ rate}$ which is the value of RAN UL data rate for the APN ID indicated in the corresponding PDN connection establishment message, $RAN_{DL\ data\ rate}$ which is the value of RAN DL data rate for the APN ID indicated in the corresponding PDN connection establishment message, and a list of one or more information set_H3, each information set_H3 may include one or more of the following information elements not limited to a class ID, a condition which indicates the condition that the information set_H3 is available, $CN_{UL\ data\ rate}$ which is the value of CN UL data rate for the APN ID indicated in the corresponding PDN connection establishment message, and $CN_{DL\ data\ rate}$ which is the value of CN DL data rate for the APN ID indicated in the corresponding PDN connection establishment message. For example, if the condition in set_G3 indicates "licensed", then "licensed" would indicate that information set_G3 is applicable when all radio resource is over licensed spectrum. On the other hand, if the condition in set_G3 indicates "unlicensed", then "unlicensed" would indicate that information set_G3 is applicable when any radio resource over unlicensed spectrum is utilized. Similarly, for example, if the condition in set_H3 indicates "licensed", then "licensed" would indicate that information set_H3 is applicable when all radio resource is over licensed spectrum. On the other hand, if the condition in set_H3 indicates "unlicensed", then "unlicensed" would indicate that information set_H3 is applicable when any radio resource over unlicensed spectrum is utilized.

In response to receiving the MME UL/DL data rate configuration message from the MME, the eNB would maintain the information of the information set_G3 and in step S708 transmit an eNB UL/DL data rate configuration message to the UE. The eNB UL/DL data rate configuration message may include the information elements not limited to: applied class ID and a list of one or more information set_I3, each information set_I3 may include one or more of the following information elements not limited to: a class ID which is the value of the information element identical to the value of the class ID in the information set_H3, a condition: which indicates the condition that the information set_I3 is available, $CN_{UL\ data\ rate}$ which indicates the value of CN UL data rate for the APN ID indicated in the corresponding PDN connection establishment message, $CN_{DL\ data\ rate}$ which indicates the value of CN DL data rate for the APN ID indicated in the corresponding PDN connection establishment message, $RAN_{UL\ data\ rate}$ which indicates the value of RAN UL data rate for the APN ID indicated in the corresponding PDN connection establishment message, and $RAN_{DL\ data\ rate}$ which indicates the value of RAN DL data rate for the APN ID indicated in the corresponding PDN connection establishment message. For example, if the condition in set_I3 indicates "licensed", then "licensed" would indicate that information set_I3 is applicable when all radio resource is over licensed spectrum. On the other hand, if the condition in set_I3 indicates "unlicensed", then "unlicensed" would indicate that information set_I3 is applicable when any radio resource over unlicensed spectrum is utilized. In response to receiving the eNB UL/DL data rate configuration message from eNB, the UE would maintain the information of the information set_I3 and also apply the applied class ID and the corresponding data rate configuration as indicated in the eNB UL/DL data rate configuration message.

Figure 8:
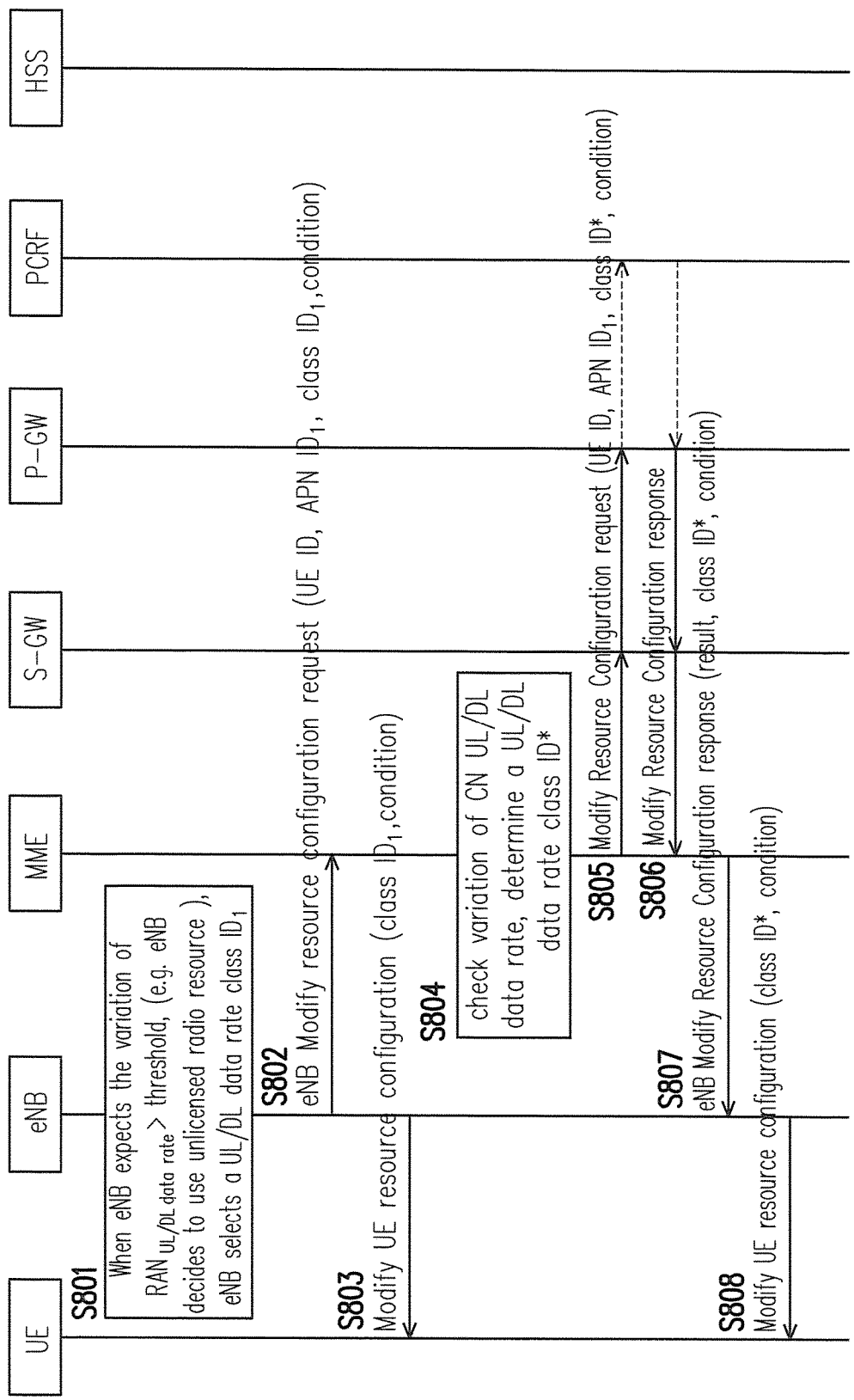
FIG. 8 illustrates a signaling diagram for implementing eNB triggered UL/DL data rate class modification in accordance with a fourth exemplary embodiment of the disclosure.

FIG. 8 illustrates a signaling diagram for implementing eNB triggered UL/DL data rate class modification in accordance with a fourth exemplary embodiment of the disclosure. In step S801, an eNB may determine to change the radio resource configuration for a UE by selecting another maximum data rate class when the expected variation of $RAN_{UL/DL\ data\ rate}$ exceeds a pre-configured threshold. The eNB may do so by using or releasing an unlicensed radio resource or by adding or removing one or more CCs for the UE. The decision for determining the expected variation of $RAN_{UL/DL\ data\ rate}$ exceeds a pre-configured threshold could be based on the information provided by one or more UEs such as information from one or more UE measurement reports, one or more MDT reports, or other messages from one or more UEs. The information provided by the one or more UEs may include not limited to: the average UL packet buffering time, buffer status report, retransmission attempts and, etc. In step S802, the eNB may transmit to an MME an eNB Modify Resource Configuration request message which may include the following information not limited to: a UE ID which is the identity of the UE (e.g., P-TMSI, GUTI, IMSI, etc.), an APN ID which is the identity of the APN for the PDN connection to be modified, an applied class ID which is the identity of the data rate class suggested by the eNB, an applied condition which indicates the condition that the configuration is applied. For example, if the condition indicates "licensed", then "licensed" would indicate that the configuration is applied when all radio resource is over licensed spectrum. On the other hand, if the condition indicates "unlicensed", then "unlicensed" would indicate that the configuration is applied when any radio resource over unlicensed spectrum is utilized.

In step S803, the eNB may send a Modify UE resource configuration essage to the UE. The Modify UE resource configuration message could be a RRCConnectionReconfiguration message or a new message. The Modify UE resource configuration message may include the following information not limited to an applied class ID which is the identity of the data rate class to be applied, an applied condition which indicates the condition that the configuration is applied, $CN_{UL\ data\ rate}$ which is the value of CN UL data rate of the corresponding class ID, $CN_{DL\ data\ rate}$ which is the value of CN DL data rate of the corresponding class ID, $RAN_{UL\ data\ rate}$ which is the value of RAN UL data rate of the corresponding class ID, and $RAN_{DL\ data\ rate}$ which is the value of RAN DL data rate of the corresponding class ID. In response to receiving the Modify UE resource configuration message from the eNB, the UE may apply the configuration according to the information in the Modify UE resource configuration message. If the UE is unable to apply the configuration, the UE may transmit to the eNB a feedback message which may include the cause of the unsuccessfully applying of the configuration.

In response to receiving the eNB Modification Resource Configuration request message from the eNB, in step S804, the MME may check the expected variation of $CN_{UL/DL\ data\ rate}$ and may determine a data rate class which could be different from the data rate class as indicated by the class ID within the eNB Modify Resource Configuration request message suggested by the eNB. In step S805, the MME may transmit a Modify Resource Configuration request message to one or more core network elements (e.g., S-GW, P-GW, PCRF, and etc.) for a request to modify the maximum data rate. The Modify Resource Configuration request message may include the following information not limited to: a UE ID, an APN ID, a class ID which is the identity of the data rate class suggested by the MME, and a condition which indicates the condition to be applied to the class ID.

In response to receiving a Modify Resource Configuration request message, in step S806, the one or more core network elements (e.g., S-GW, P-GW, PCRF, and etc.) may transmit a Modify Resource Configuration response message to the MME. The modify Resource Configuration response message may include the following information not limited to a result which indicates the CN element accepts or rejects the modification of the resource configuration, a cause which indicates the cause of reject, if any, an applied class ID which is a class ID which may be the different to the class ID suggested by the MME, an applied condition which is the applied condition of the applied class ID, and a list of one or more information set_A4, each information set_A4 may include one or more of the following information elements not limited to: a class ID, a condition which indicates the condition that the information set_A4 is available, $RAN_{UL\ data\ rate}$ which is the value of RAN UL data rate of the corresponding class ID, $RAN_{DL\ data\ rate}$ which is the value of RAN DL data of the corresponding class ID, $CN_{UL\ data\ rate}$ which is the value of CN UL data rate of the corresponding class ID, and $CN_{DL\ data\ rate}$ which the value of CN DL data rate of the corresponding class ID.

In response to receiving the Modify Resource Configuration response message, the MME should not modify the resource configuration if the CN element has rejected the modification. (Alternatively, the MME may restore the configuration as before transmitting the Modify Resource Configuration request message) In step S807, the MME may transmit an eNB Modification Resource Configuration response message with the following information not limited to: a result which indicates the MME accepted or rejected the modification of the resource configuration, a cause which indicates the cause of reject, if any, an applied class ID which indicates a class ID to be applied, an applied condition which is the applied condition of the applied class ID, and a list of one or more information set_B4, each information set_B4 may include one or more of the following information elements not limited to: a class ID, a condition which indicates the condition that the information set_B4 is available, $CN_{UL\ data\ rate}$ which is the value of CN UL data rate of the corresponding class ID, $CN_{DL\ data\ rate}$ which is the value of CN DL data rate of the corresponding class ID, $RAN_{UL\ data\ rate}$ which is the value of RAN UL data rate of the corresponding class ID, and $RAN_{DL\ data\ rate}$ which is the value of RAN DL data rate of the corresponding class ID.

In response to receiving the eNB Modify Resource Configuration response message from the MME, if the result in the eNB Modify Resource Configuration response message indicates that the data rate modification is not successful, the eNB does not modify the resource configuration (the eNB may alternatively restore the configuration as before sending the eNB Modify Resource Configuration request message). In step S808, the eNB may transmit a Modify UE resource configuration message to the UE which corresponds to the UE ID as indicated in the eNB Modify Resource Configuration request message. The Modify UE resource configuration message may include the following information not limited to: an applied class ID, an applied condition, $CN_{UL\ data\ rate}$ which is the value of CN UL data rate of the corresponding class ID, $CN_{DL\ data\ rate}$ which is the value of CN DL data rate of the corresponding class ID, $RAN_{UL\ data\ rate}$ which is the value of RAN UL data rate of the corresponding class ID, and $RAN\ D_{L\ data\ rate}$ which is the value of RAN DL data rate of the corresponding class ID.

When the MME which sent a Modify Resource Configuration request message to a CN element in step S805, the MME would maintain the information carried in the Modify Resource Configuration response message if the CN element didn't reject the modification request. The MME in step S806 may transmit an eNB Modification Resource Configuration response message to the eNB. The eNB Modification Resource Configuration response message may include the following information not limited to a result which indicates the MME accepted or rejected the modification of the resource configuration, a cause if any, an applied class ID which is the identity of the data rate class to be applied, an applied condition, and a list of one or more information set_C4, each information set_C4 may include one or more of the following information elements not limited to: a class ID, condition which indicates the condition that the information set_C4 is available, $RAN_{UL\ data\ rate}$ which is the value of RAN UL data rate of the corresponding class ID, $RAN_{DL\ data\ rate}$ which is the value of RAN DL data rate of the corresponding class ID, $CN_{UL\ data\ rate}$ which is the value of CN UL data rate of the corresponding class ID, $CN_{DL\ data\ rate}$ which is the value of CN DL data rate of the corresponding class ID. When the eNB receives the eNB Modification Resource Configuration response message from the MME and the MME didn't reject the modification request, the eNB would maintain the information in the eNB Modification Resource Configuration response message.

Figure 9:
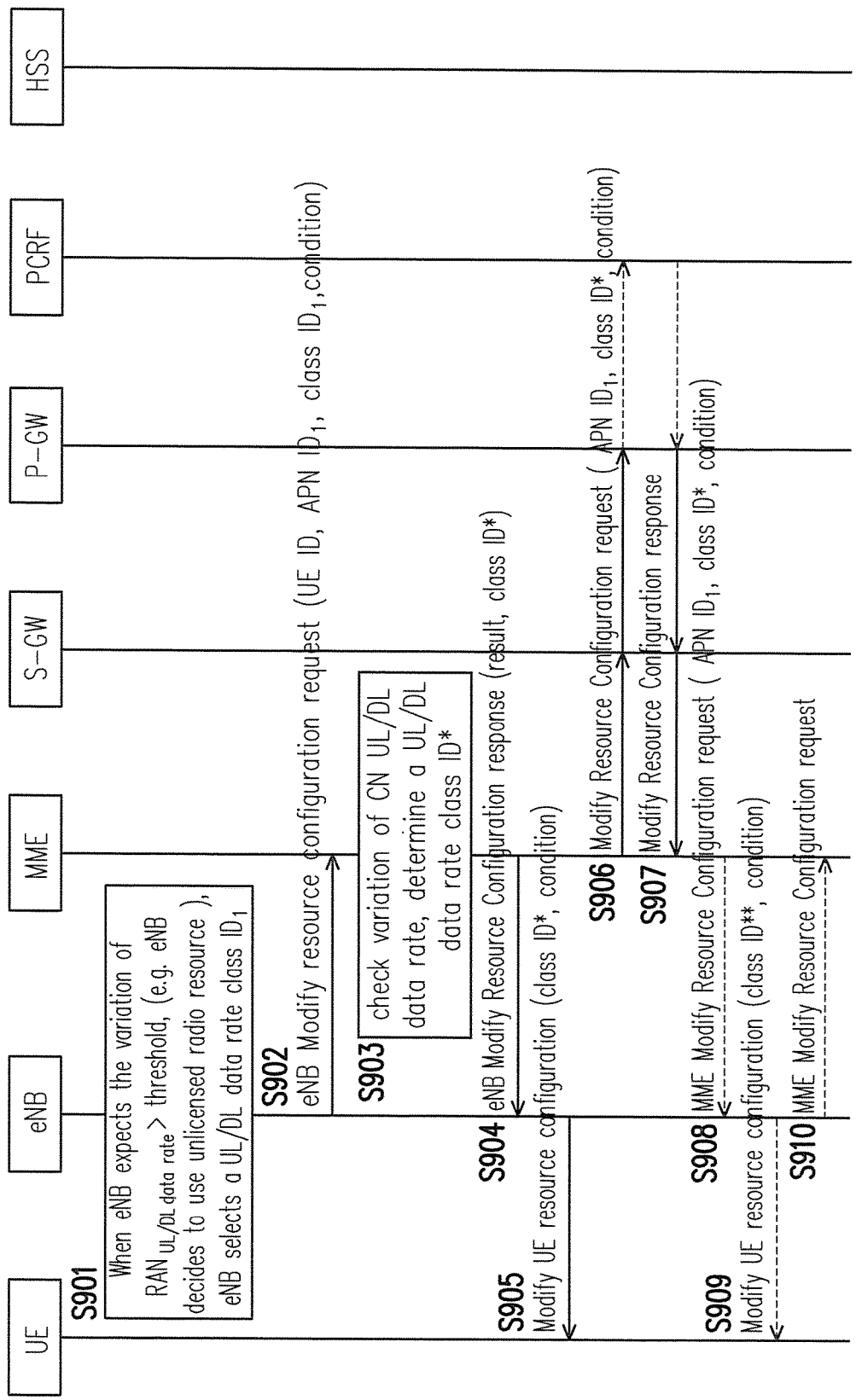
FIG. 9 illustrates a signaling diagram for implementing eNB triggered UL/DL data rate class modification in accordance with a fifth exemplary embodiment of the disclosure.

FIG. 9 illustrates a signaling diagram for implementing eNB triggered UL/DL data rate class modification in accordance with a fifth exemplary embodiment of the disclosure. In step S901, an eNB may determine whether to select another maximum data rate class by the expected variation of $RAN_{UL/DL\ data\ rate}$. If the expected variation of $RAN_{UL/DL\ data\ rate}$ exceeds a pre-configured threshold, the eNB may select another maximum data rate class. The eNB may also decide to add or to release unlicensed radio resource or add or remove one or more CCs for the UE. In step S902, the eNB may transmit to the MME an eNB Modify Resource Configuration request message which may include the following information not limited to: a UE ID which is the identity of the UE (e.g., P-TMSI, GUTI, IMSI, etc.), an APN ID which is the identity of the APN for the PDN connection to be modified, a class ID which is the identity of the data rate class suggested by the eNB, a condition which indicates the condition that the configuration is applied. For example, if the condition indicates "licensed", then "licensed" would indicate that the configuration is applied when all radio resource is over licensed spectrum. On the other hand, if the condition indicates "unlicensed", then "unlicensed" would indicate that the configuration is applied when any radio resource over unlicensed spectrum is utilized.

In response to receiving the eNB Modification Resource Configuration request message from an eNB, in step S903, the MME may check the expected variation of $CN_{UL/DL\ data\ rate}$ and may determine a data rate class (or a class ID) which could be different with the class ID suggested by the eNB. In response to receiving the eNB Modification Resource Configuration request message, in step S904, the MME may transmit an eNB Modification Resource Configuration response message to the eNB which may include the following information not limited to: a result which indicates the MME accepts or rejects the modification of the resource configuration, a cause which indicates the cause of reject, if any, an applied class ID which is the class ID to be applied for UL/DL data rate that may be different to the class ID suggested by the eNB, an applied condition, and a list of one or more information set_A5, each information set_A5 may include one or more of the following information elements not limited to: a class ID, a condition which indicates the condition that the information set_A5 is available, $RAN_{UL\ data\ rate}$ which is the value of RAN UL data rate of the corresponding class ID, $RAN_{DL\ data\ rate}$ which is the value of RAN DL data of the corresponding class ID, $CN_{UL\ data\ rate}$ which is the value of CN UL data rate of the corresponding class ID, and $CN_{DL\ data\ rate}$ which is the value of CN DL data rate of the corresponding class ID.

In response to receiving the eNB Modify UE resource configuration response message from the MME, if the result in the eNB Modify Resource Configuration response message shows that the MME did not accept the configuration request to change the maximum data rate, the eNB would not modify the resource configuration (Alternatively, the eNB would restore the configuration as before sending the eNB Modify Resource Configuration request message). In step S905, the eNB may send to the UE a Modify UE resource configuration message which could be a RRCConnectionReconfiguration message or a new message. The Modify UE resource configuration message may include the following information not limited to: an applied class ID which is the identity of the data rate class to be applied, an applied condition which indicates the condition that the configuration is applied, $RAN_{UL\ data\ rate}$ which is the value of RAN UL data rate of the corresponding class ID, $RAN_{DL\ data\ rate}$ which is the value of RAN DL data rate of the corresponding class ID, $CN_{UL\ data\ rate}$ which is the value of CN UL data rate of the corresponding class ID, and $CN_{DL\ data\ rate}$ which is the value of CN DL data rate of the corresponding class ID. In response to receiving the Modify UE resource configuration message from the eNB, the UE would apply the configuration according to the information in the Modify UE resource configuration message. If the UE is not able to apply the configuration, the UE would transmit a feedback message to the eNB. The feedback message may include the cause of not unsuccessfully applying of the configuration.

In step S906, the MME may transmit a Modify Resource Configuration request message to request the modification of the maximum data rate to one or more core network elements such as S-GW, P-GW, PCRF, and etc. The Modify Resource Configuration request message may include the following information not limited to the UE ID, an APN ID, a class ID which is the identity of the data rate class suggested by the MME, and a condition which indicates the condition that the configuration is applied. When the CN element receives a Modify Resource Configuration request message, in step S907, the CN element may transmit a Modify Resource Configuration response message to the MME. The modify Resource Configuration response message may include the following information not limited to a result which indicates the CN element accepts or rejects the modification of the resource configuration, a cause which indicates the cause of reject, if any, an applied class ID which is the class ID to be applied for UL/DL data rate that may be different from the class ID suggested by the MME, an applied condition, and a list of one or more information set_B5, each information set_B5 may include one or more of the following information elements not limited to: a class ID, a condition which indicates the condition that the information set_N is available, $RAN_{UL\ data\ rate}$ which is the value of RAN UL data rate of the corresponding class ID, $RAN_{DL\ data\ rate}$ which is the value of RAN DL data rate of the corresponding class ID, $CN_{UL\ data\ rate}$ which is the value of CN UL data rate of the corresponding class ID, and $CN_{DL\ data\ rate}$ which is the value of CN DL data rate of the corresponding class ID.

If the MME has received a Modify Resource Configuration response message from the CN element, the MME would maintain the information carried in the Modify Resource Configuration response message if the CN element did not reject the modification request to change the maximum data rate. However, in response to receiving the Modify Resource Configuration response message from the CN element, the MME instead would not modify the resource configuration if the CN element has rejected the modification request to change the maximum data rate. (Alternatively, the MME may restore the configuration as before sending the Modify Resource Configuration request message)

In step S908, the MME may transmit to the eNB an MME Modification Resource Configuration request message with the following information not limited to: the UE ID, an APN ID, an applied class ID which the class ID to be applied for UL/DL data, an applied condition, and a list of one or more information set_5C, each information set_5C may include one or more of the following information elements not limited to: a class ID, a condition which indicates the condition that the information set_U is applied, $RAN_{UL\ data\ rate}$ which is the value of RAN UL data rate of the corresponding class ID, $RAN_{DL\ data\ rate}$ which is the value of RAN DL data of the corresponding class ID, $CN_{UL\ data\ rate}$ which the value of CN UL data rate, and $CN_{DL\ data\ rate}$ which is the value of CN DL data rate.

In response to receiving an MME Modify Resource Configuration request message from an MME, the eNB would store and apply the information as indicated in the request message. If the eNB is not able to apply the configuration, the eNB may include the cause of not successfully applying of the configuration in the subsequent MME Modify Resource Configuration response message to the MME in step S910. The MME Modify Resource Configuration response message may include the following information not limited to a result which indicates success or failure of applying the configuration, and a cause, if any. In step S909, the eNB may transmit a Modify UE resource configuration message to the UE. The Modify UE resource configuration message could be a RRCConnectionReconfiguration message or a new message. The Modify UE resource configuration message may include the following information not limited to an applied class ID which is the identity of the data rate class to be applied, an applied condition which indicates the condition that the configuration is applicable, $RAN_{UL\ data\ rate}$ which is the value of RAN UL data rate of the corresponding class ID, $RAN_{DL\ data\ rate}$ which is the value of RAN DL data rate of the corresponding class ID, $CN_{UL\ data\ rate}$ which is the value of CN UL data rate of the corresponding class ID, and $CN_{DL\ data\ rate}$ the value of CN DL data rate of the corresponding class ID.

Figure 10:
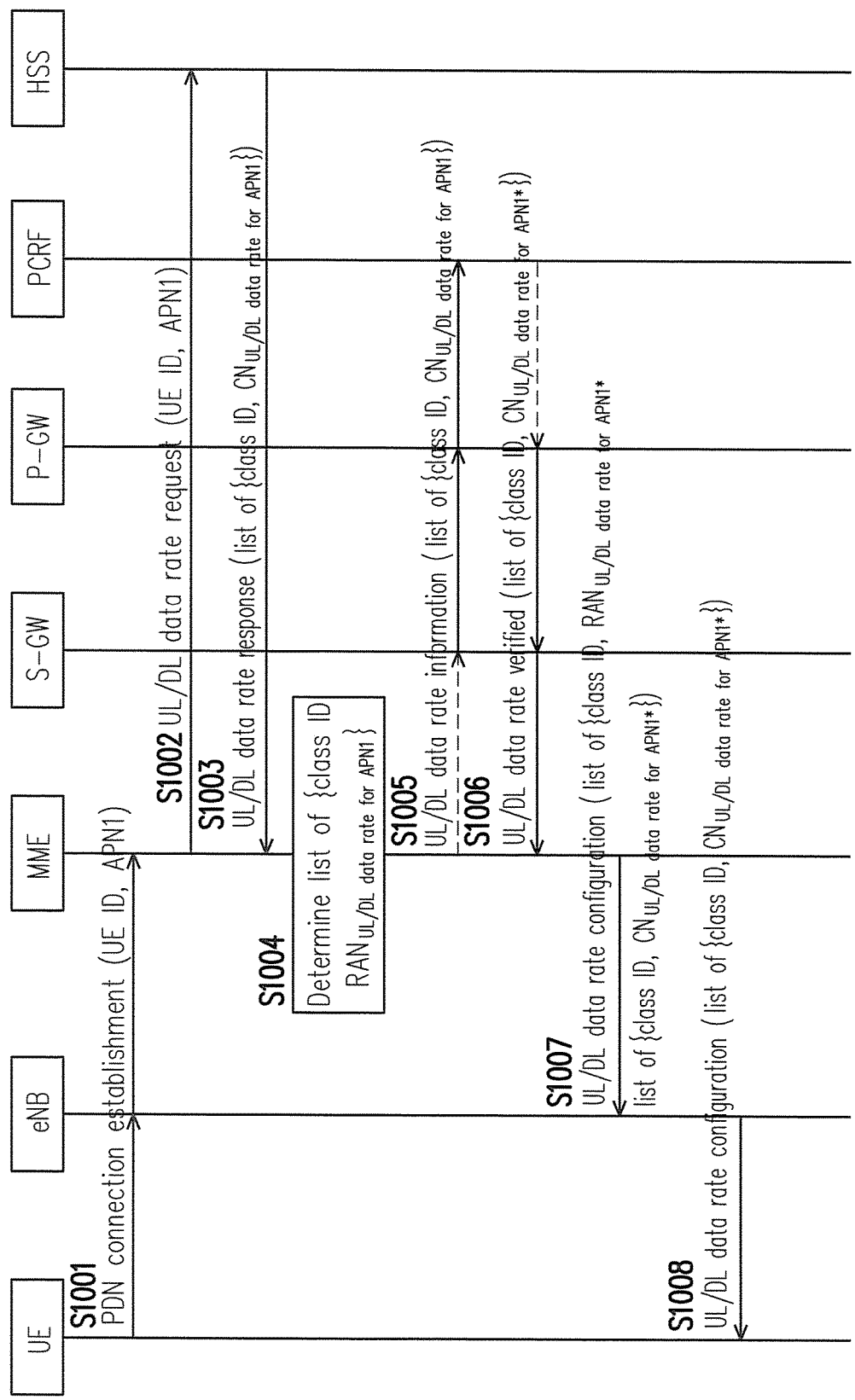
FIG. 10 illustrates a signaling diagram for configuring UL/DL data rate classes in accordance with an alternative of the first exemplary embodiment of the disclosure.

FIG. 10 illustrates a signaling diagram for configuring UL/DL data rate classes in accordance with an alternative of the first exemplary embodiment of the disclosure. In step S1001, the UE may transmit to an eNB a PDN connection establishment message which may include not limited to a UE ID and an APN ID. The PDN connection establishment message could be one of a PDN Connectivity Request message, an Attach Request message, a Tracking Area Update Request message, a Service Request message, and a new message. UE ID would be the identity of a UE such as P-TMSI, GUTI, IMSI, and etc. The APN ID would be the identity of the APN for the PDN connection to be established. When the eNB (i.e., an E-UTRAN access node) receives a PDN connection establishment message from a UE, the eNB may determine a MME based on the infoination elements in the PDN connection establishment message. The eNB would forward the PDN connection establishment message to the MME.

In response to receiving the PDN connection establishment message from an eNB, in step S1002, the MME would send a UL/DL data rate request message to home subscriber service (HSS) to query for UE context if there is no corresponding UE context in the MME. The UL/DL data rate request message may include not limited to one or more of a UE ID, an APN ID which is the identity of the APN for the PDN connection to be established. In response to receiving the UL/DL data rate request message, in step S1003, the HSS may transmit a UL/DL data rate response to the MME which would maintain the information carried in the UL/DL data rate response message. The UL/DL data rate response message may include not limited to: one of a list of one or more information (set_A11), each information set_A1 may include not limited to: a class ID which is the identity of a data rate class (e.g., an AMBR class ID), $CN_{UL/DL\ data\ rate\ for\ APN}$ which is the corresponding value of the CN UL data rate and/or the corresponding value of the CN DL data rate which corresponds to the APN ID, and optionally a condition. For example, if the condition indicates "licensed", then "licensed" would indicate that information set_A11 is applicable when all radio resource is over licensed spectrum. On the other hand, if the condition indicates "unlicensed", then "unlicensed" would indicate that information set_A11 is applicable when any radio resource over unlicensed spectrum is utilized.

In response to receiving the UL/DL data rate verified, in step S1004, the MME should determine a list of information set_B11, and each information set_B11 may include one or more of the following information elements not limited to: a class ID and $RAN_{UL/DL\ data\ rate}$ which is the corresponding value of RAN UL data rate for the APN ID indicated in the corresponding PDN connection establishment message and/or corresponding value of RAN DL data rate for the APN ID indicated in the corresponding PDN connection establishment message.

After receiving the UL/DL data rate response message, in step S1005, the MME would transmit a UL/DL data rate information message to a S-GW, and the S-GW may send a UL/DL data rate information message to a P-GW, the UL/DL data rate information messages may include the information elements not limited to a suggested class ID which indicates the data rate class that the MME suggested to be applied to the PDN connection associated with the APN ID, and $CN_{UL/DL\ data\ rate\ for\ APN}$ which is the corresponding value of the CN UL data rate and/or the corresponding value of the CN DL data rate which corresponds to the APN ID. The P-GW which received the UL/DL data rate information message may forward the information to a Policy and Charging Rules Function (PCRF).

In response to the P-GW and/or PCRF receiving the UL/DL data rate information message, the P-GW and/or PCRF may in step S1006 transmit a UL/DL data rate verified message with the determined class ID and the determined $CN_{UL/DL\ data\ rate\ for\ APN}$ which is the corresponding value of the CN UL data rate and/or the corresponding value of the CN DL data rate which corresponds to the APN ID. In step S1007, the MME would transmit an UL/DL data rate configuration message to the eNB. The UL/DL data rate configuration message may include not limited to a to be applied class ID, to be applied $RAN_{UL/DL\ data\ rate\ for\ APN}$ which is the corresponding value of the RAN UL data rate and/or the corresponding value of the RAN DL data rate which correspond to the APN ID, and a list of information set_C11, and each information set_C11 may include one or more of the following information elements not limited to: a class ID and $CN_{UL/DL\ data\ rate}$ which is the corresponding value of CN UL data rate for the APN ID indicated in the corresponding PDN connection establishment message and/or corresponding value of CN DL data rate for the APN ID indicated in the corresponding PDN connection establishment message. When the eNB receives the UL/DL data rate configuration message from the MME, the eNB may maintain the information of the UL/DL data rate configuration message from the MME. In step S1008, the eNB would transmit to the UE an UL/DL data rate configuration message which may include not limited to the class ID and $CN_{UL\ data\ rate}$ which is the corresponding value of CN UL data rate for the APN ID indicated in the corresponding PDN connection establishment message. The $CN_{UL\ data\ rate}$ and $CN_{DL\ data\ rate}$ may be included as information of a NAS message that is transmitted via the eNB to a UE by an AS message. In response to receiving the eNB UL/DL data rate configuration message from eNB, the UE may maintain the information of UL/DL data rate configuration message. The UE may apply the applied class ID and the corresponding data rate configuration as indicated in the UL/DL data rate configuration message.

Figure 11:
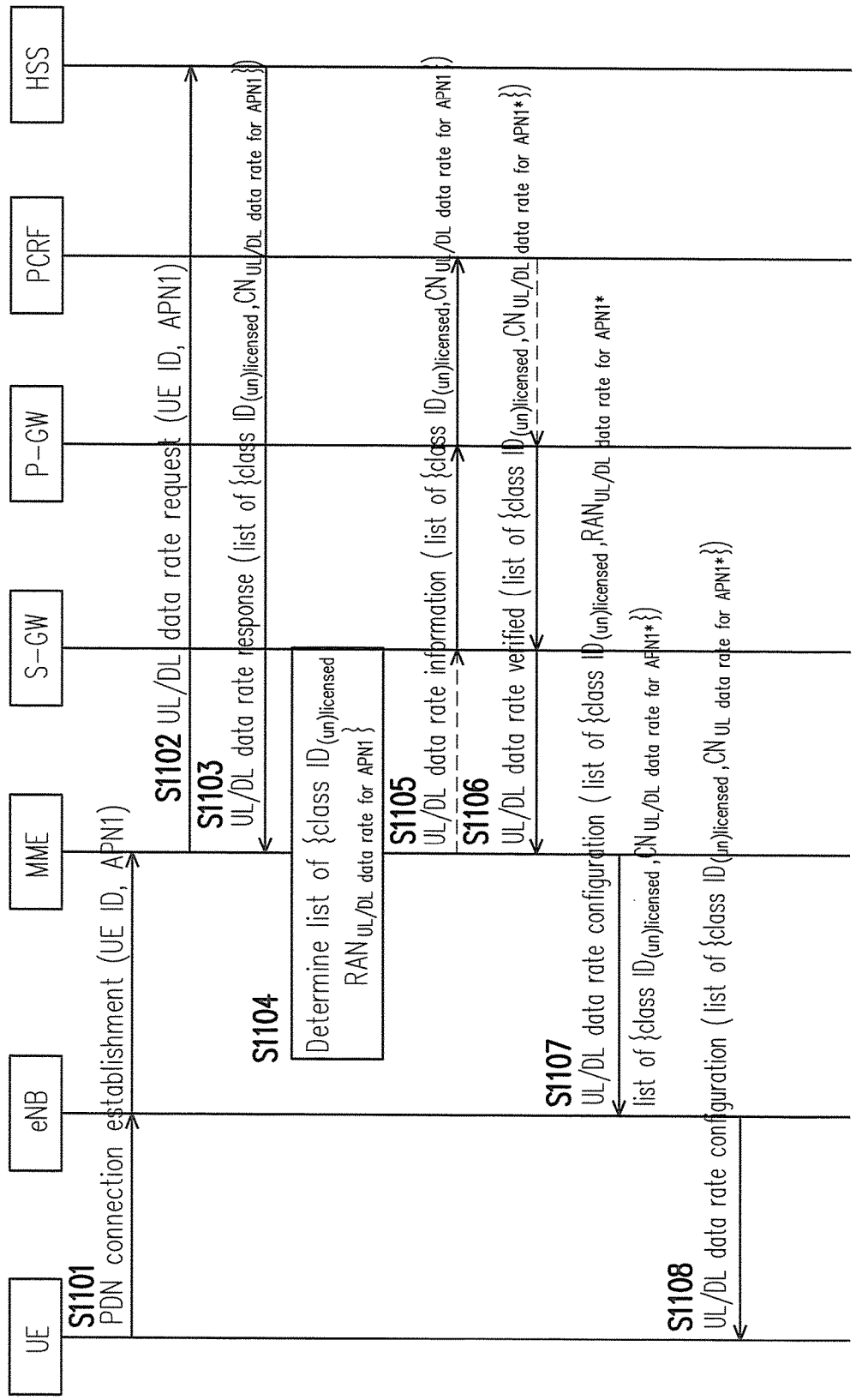
FIG. 11 illustrates a signaling diagram for configuring UL/DL data rate classes in accordance with an alternative of the fourth exemplary embodiment of the disclosure.

FIG. 11 illustrates a signaling diagram for configuring UL/DL data rate classes in accordance with an alternative of the third exemplary embodiment of the disclosure. In step S1101, a UE may initiate a new PDN connection to an APN by transmitting a PDN connection establishment message to an eNB. The PDN connection establishment message could be one of a PDN Connectivity Request message, an Attach Request message, a Tracking Area Update Request message, a Service Request message, a new message, and etc. The PDN connection establishment message may include the following information elements not limited to: a UE ID which is the identity of the UE (e.g., P-TMSI, GUTI, IMSI) and an APN ID which the identity of the APN for the PDN connection to be established. In response to receiving the PDN connection establishment message from the UE, the eNB would determine a MME based on the information elements in the PDN connection establishment message. The eNB may then forward the PDN connection establishment message to the MME.

In response to receiving a PDN connection establishment message from an eNB, in step S1102, the MME may transmit a UL/DL data rate request message to HSS to query for UE context if there is no corresponding UE context in the MME. The UL/DL data rate request message may include the following information elements not limited to the UE ID and an APN ID which the identity of the APN for the PDN connection to be established. In step S1103, the MME may receive a UL/DL data rate response message from the HSS. The MME may maintain the information carried in the UL/DL data rate response message. The UL/DL data rate response message may include the following information elements not limited to: a list of one or more information set_A21, each information set_A21 may include one or more of the following information elements not limited to: a class $ID_{(un)licensed}$ which is the identity of a data rate class (e.g., an AMBR class ID) for either a licensed spectrum or an unlicensed spectrum and $CN_{UL/DL\ data\ rate\ for\ APN}$ which is the corresponding value of the core network maximum UL or DL data rate associated with the class $ID_{(un)licensed}$. Alternatively, each information set_A21 may include one or more of the following information elements not limited to: a class ID which is the identity of a data rate class (e.g., an AMBR class ID) and $CN_{UL/DL\ data\ rate\ for\ APN(unlicensed)}$ which is the corresponding value of the core network maximum UL or DL data rate in either licensed spectrum or unlicensed spectrum associated with the class ID.

In response to receiving the UL/DL data response message from the HSS, in step S1104, the MME would determine a list of information set_B21, each information set_B21 may include one or more of the following information elements not limited to: a class $ID_{(un)licensed}$ and $RAN_{UL/DL\ data\ rate\ for\ APN}$. The class $ID_{(un)licensed}$ is the identity of a data rate class (e.g., an AMBR class ID) for either a licensed spectrum or an unlicensed spectrum, and $RAN_{UL/DL\ data\ rate\ for\ APN}$ is the corresponding value of the RAN maximum UL or DL data rate associated with the class $ID_{(un)licensed}$.

In step S1105, the MME may transmit a UL/DL data rate information message to a S-GW and the S-GW may send a UL/DL data rate information message to a P-GW, may include the information elements not limited to a list of information set_C21, each information set_C21 may include one or more of the following information elements not limited to: a suggested class $ID_{(un)licensed}$ which is the identity of a suggested data rate class (e.g., an AMBR class ID) for either a licensed spectrum or an unlicensed spectrum and suggested $CN_{UL/DL\ data\ rate\ for\ APN}$ which is the corresponding value of the core network maximum UL or DL data rate associated with the class $ID_{(un)licensed}$ as suggested by the MME. In response to receiving the UL/DL data rate information message, the P-GW and/or PCRF may determine a list of one or more information set_C21 according to the information elements in the received UL/DL data rate information message. In response to receiving the UL/DL data rate information message, in step S1106, the P-GW and/or PCRF may transmit a UL/DL data rate verified message which may include the information elements not limited to a list of information set_D21, each information set_D21 may include one or more of the following information elements not limited to: a determined class $ID_{(un)licensed}$ which is the identity of a suggested data rate class (e.g., an AMBR class ID) for either a licensed spectrum or an unlicensed spectrum as determined by the CN element and determined $CN_{UL/DL\ data\ rate\ for\ APN}$ which is the corresponding value of the core network maximum UL or DL data rate associated with the class $ID_{(un)licensed}$ as determined by the CN element.

In response to receiving the UL/DL data rate verified message, in step S1107, the MME would transmit an MME UL/DL data rate configuration message to the same eNB that has sent the PDN connection establishment message. The MME UL/DL data rate configuration message may include the following information not limited to: a list of information set_E21, each information set_E21 may include one or more of the following information elements not limited to: a class $ID_{(un)licensed}$ which is the identity of a data rate class (e.g., an AMBR class ID) for either a licensed spectrum or an unlicensed spectrum, $RAN_{UL/DL\ data\ rate\ for\ APN}$ which is the corresponding value of the RAN maximum UL or DL data rate associated with the class $ID_{(un)licensed}$, and a list of information set_F21, each information set_F21 may include one or more of the following information elements not limited to: a $ID_{(un)licensed}$ which is the identity of a data rate class for either a licensed spectrum or an unlicensed spectrum as previously determined and determined $CN_{UL/DL\ data\ rate\ for\ APN}$ which is the corresponding value of the core network maximum UL or DL data rate associated with the class $ID_{(un)licensed}$ as previously determined. In response to receiving the MME UL/DL data rate configuration message from the MME, the eNB would maintain the information of the information set_E21 and in step S1108 transmit an eNB UL/DL data rate configuration message to the UE. The eNB UL/DL data rate configuration message may include the information elements not limited to: a list of one or more information set_G21, each information set_G21 may include one or more of the following information elements not limited to: an $ID_{(un)licensed}$ which is the identity of a data rate class for either a licensed spectrum or an unlicensed spectrum as previously determined and $CN_{UL/DL\ data\ rate\ for\ APN}$ which is the corresponding value of the core network maximum UL or DL data rate associated with the class $ID_{(un)licensed}$ as previously determined. In response to receiving the eNB UL/DL data rate configuration message from eNB, the UE would maintain the information of the information set_G21 and apply the class ID and the corresponding $CN_{UL/DL\ data\ rate\ for\ APN}$ data rate configuration as indicated in the UL/DL data rate configuration message.

Figure 12:
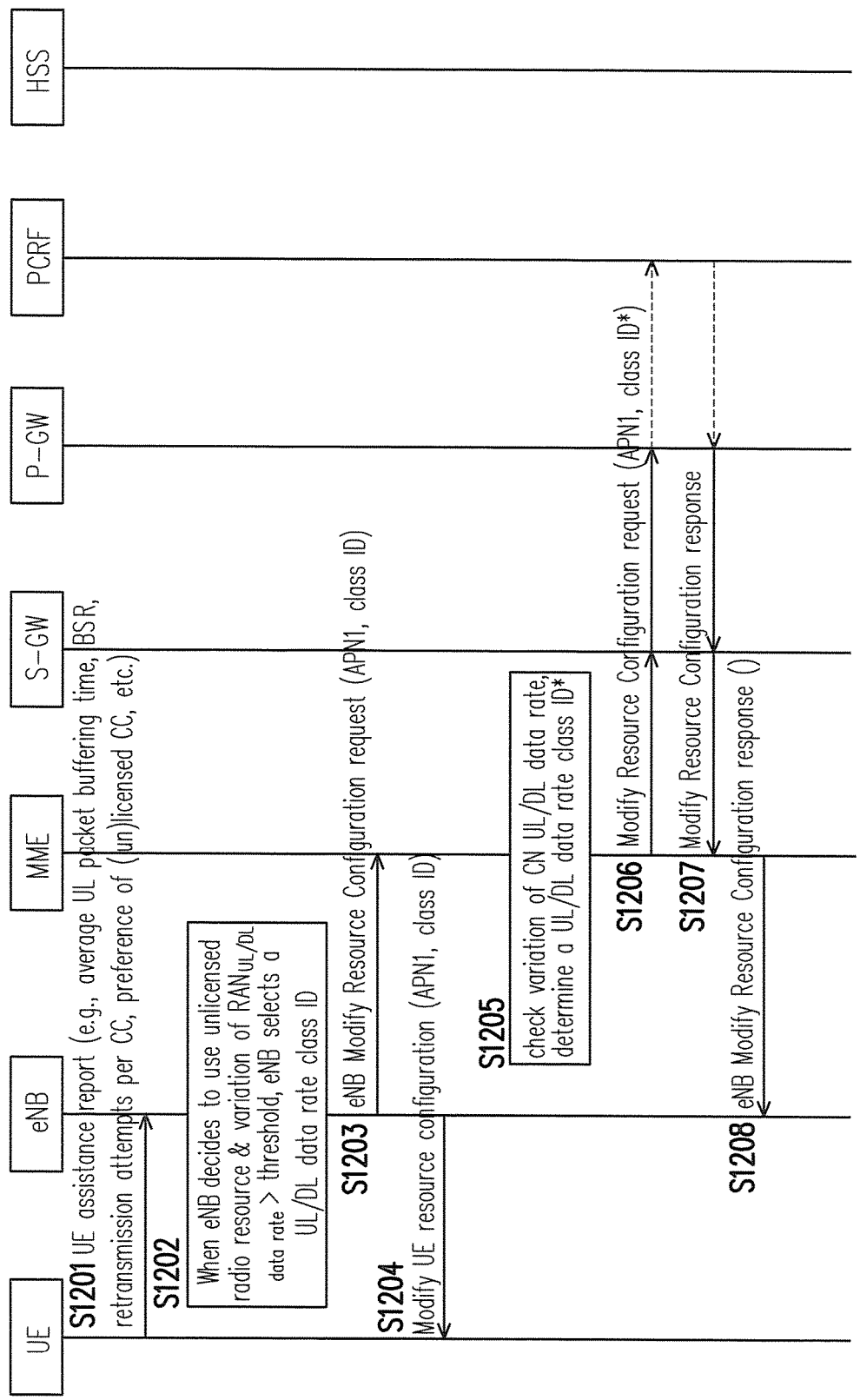
FIG. 12 illustrates a signaling diagram for implementing UE assisted maximum data rate modification in accordance with a sixth exemplary embodiment of the disclosure.

FIG. 12 illustrates a signaling diagram for implementing UE assisted maximum data rate modification in accordance with a sixth exemplary embodiment of the disclosure. For this exemplary embodiment, the eNB may take UE preference into account. For example, the UE may prefer licensed CCs or unlicensed CCs. Moreover, the eNB may take UE statistical information into account instead of only considering UE measurement report. After receiving an UE assistance report, the network may have more information determine the maximum UL/DL data rate class by using the information from the UE assistance report.

In step S1201, the UE would transmit to the eNB an UE assistance report which may include not limited to: a measurement report, average UL packet buffering time, BSR re-transmission attempts per CC, preference of the licensed or unlicensed CC, and so forth. In step S1202, the eNB may determine whether to change the radio resource configuration for the UE by selecting another maximum data rate class when the expected variation of $RAN_{UL/DL\ data\ rate}$ exceeds a pre-configured threshold. The eNB may do so by using or releasing an unlicensed radio resource or by adding or removing one or more CCs for the UE. The decision for determining the expected variation of $RAN_{UL/DL\ data\ rate}$ exceeds a pre-configured threshold could also be based on the information provided by one or more UEs such as the UE assistance report of step S1201. In step S1203, the eNB may transmit to an MME an eNB Modify Resource Configuration request message which may include the following information not limited to: an APN ID which is the identity of the APN for the PDN connection to be modified and an applied class ID which is the identity of the data rate class determined by the eNB.

In step S1204, the eNB may send a Modify UE resource configuration message to the UE to switch to a new class of maximum DL/UL data rate. The Modify UE resource configuration message could be a RRCConnectionReconfiguration to message or a new message. The Modify UE resource configuration message may include the following information not limited to: an APN ID which is the identity of the APN for the PDN connection to be modified and an applied class ID which is the identity of the data rate class to be used by the UE. In response to receiving the Modify UE resource configuration message from the eNB, the UE may apply the configuration according to the information in the Modify UE resource configuration message. If the UE is unable to apply the configuration, the UE may transmit to the eNB a feedback message which may include the cause of not being able to successfully applying of the configuration.

In response to receiving the eNB Modification Resource Configuration request message from the eNB, in step S1205, the MME may check the expected variation of $CN_{UL/DL\ data\ rate}$ and may determine a data rate class which could be different from the data rate class as indicated by the class ID within the eNB Modify Resource Configuration request message suggested by the eNB. In step S1206, the MME may transmit a Modify Resource Configuration request message to one or more core network elements (e.g., S-GW, P-GW, PCRF, and etc.) for a request to modify the maximum data rate. The Modify Resource Configuration request message may include the following information not limited to: an APN ID and a class ID which is the identity of the data rate class suggested by the MME. In response to receiving a Modify Resource Configuration request message, in step S1207, the one or more core network elements (e.g., S-GW, P-GW, PCRF, and etc.) may transmit a Modify Resource Configuration response message to the MME. The Modify Resource Configuration response message may include the following information not limited to: a list of class $ID_{(un)licensed}$ and $CN_{UL/DL\ data\ rate\ for\ APN}$. Class $ID_{(un)licensed}$ is the identity of a data rate class for either a licensed spectrum or an unlicensed spectrum, and $CN_{UL/DL\ data\ rate\ for\ APN}$ is the corresponding value of the core network maximum UL or DL data rate associated with the class $ID_{(un)licensed}$. In response to receiving the Modify Resource Configuration response message, in step S1208, the MME may transmit an eNB Modification Resource Configuration response message.

Figure 13:
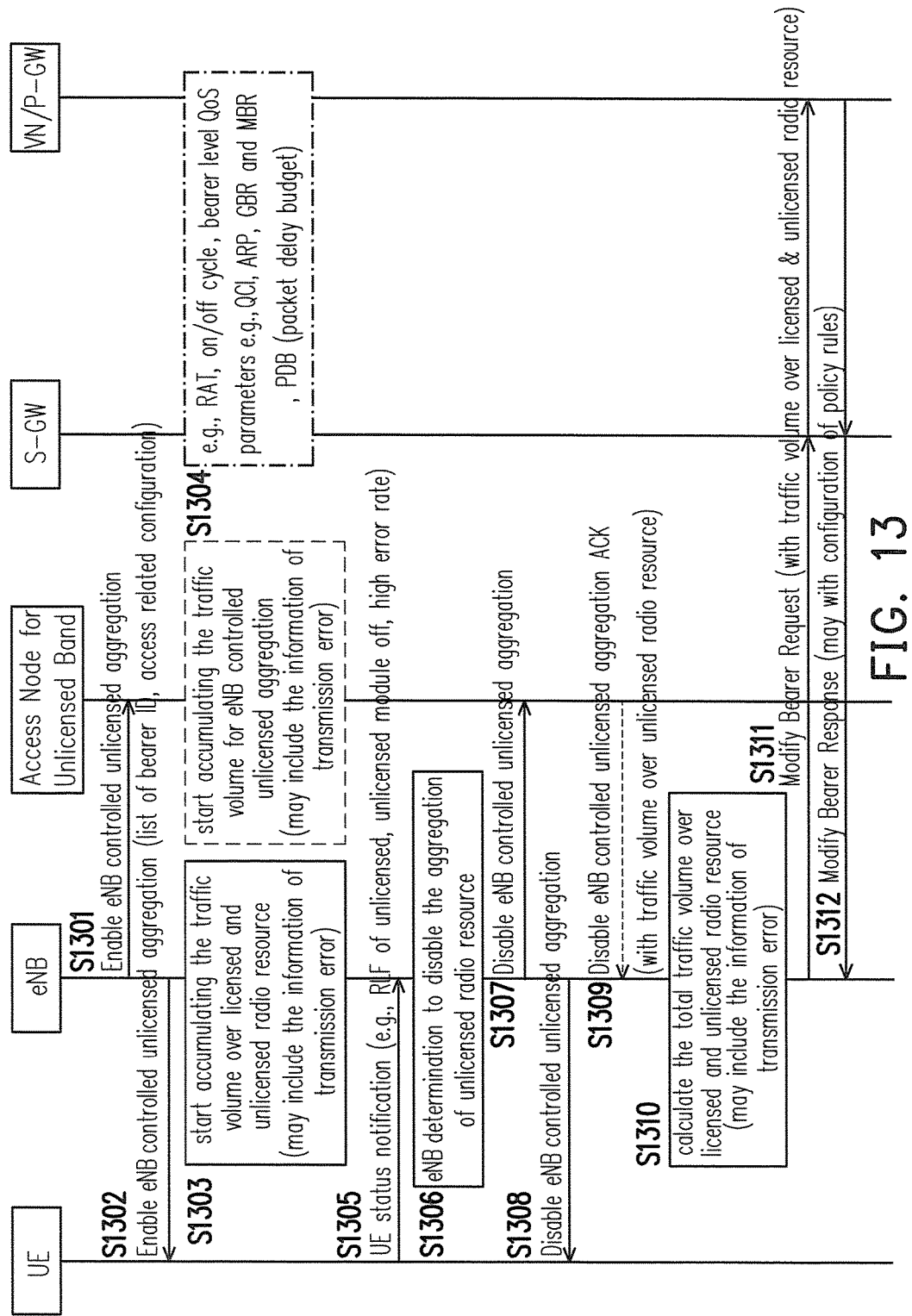
FIG. 13 illustrates a signaling diagram for implementing eNB reporting traffic volume to a core network in accordance with a seventh exemplary embodiment of the disclosure.

FIG. 13 illustrates a signaling diagram for implementing eNB reporting traffic volume to a core network in accordance with a seventh exemplary embodiment of the disclosure. In this exemplary embodiment, an eNB may accumulate network traffic information and report the network traffic information to the network work which may alter the utilization of network resources based on the accumulated network traffic information such as to add or release licensed or unlicensed network resources or to add or remove one or more CCs. In step S1301, the eNB may transmit an Enable eNB Controlled Radio Resource Modification message to an Assisted Access Node which could be, for example, an access node for unlicensed radio resource, an WLAN Access Point, a SeNB, a WT as specified in 3GPP TS 36.300, and etc. The Enable eNB Controlled Radio Resource Modification message may include one or more of the following information not limited to: a bearer ID and an access related configuration information which may include not limited to: a RAT type, on/off cycle for receiving traffic, bearer level QoS parameters, or a combination of the above. The Controlled Radio Resource Modification message may also include an accounting ID which is an identity for associating the usage of the radio resource for a specific eNB controlled radio resource modification, a UE ID which is the identity of a user equipment (UE). The bearer level QoS parameters may include one or more of QCI, ARP, GBR, MBR, and PDB, where QCI stands for QoS class identifier, ARP stands for Allocation and Retention Priority, GBR stands for Guaranteed Bit Rate, MBR stands for Maximum Bit Rate, and PDB stands for Packet Delay Budget.

In step S1302, the eNB may send an Enable eNB Controlled Radio Resource Configuration message to a UE. The Enable eNB Controlled Radio Resource Configuration message may include one or more of the following information not limited to: an accounting ID which is an Identity for associating the usage of the radio resource for a specific eNB controlled radio resource configuration, a bearer ID, an access node ID which is an identity to identify an Assisted Access Node, a CC ID, an access related configuration, and a starting time which is the time point to start applying the configuration. The UE after receiving the Enable eNB Controlled Radio Resource Configuration message from the eNB may starts recording the information of the radio resource utilization according to the configuration as included in the Enable eNB Controlled Radio Resource Configuration message. The UE may transmit an Enable eNB Controlled Radio Resource Configuration ACK message to the eNB. The UE may subsequently transmit the recorded information of the radio resource utilization to the eNB periodically or by event. The period of time for a UE to send recorded information of the radio resource utilization may be pre-configured or pre-defined. The event that triggers the UE to send the recorded information of the radio resource utilization to the eNB may include one or more of: UE status notification, inter-RAT or intra-RAT handover, release or disable of a specific radio resource, one or more UE measured QoS parameters exceeding the pre-configured or pre-defined threshold, and measurement report. The UE status notification would notify radio link failure, on or off state of the radio module of a RAT, use or release of unlicensed spectrum, and etc.

In step S1303, the eNB would start accumulating the information of radio resource utilization. The information to be accumulated may include one or more of the total traffic volume transmitted accumulated over the configured radio resource, average or total transmission errors, average or total retransmission attempts, an average buffering delay, an average transmission delay, a retransmission rate, a block error rate, a bit error rate, an average success or fail of unlicensed radio resource occupancy rate, a peak data rate, an average data rate. The information associated with UL and DL may be recorded separately. The radio resource may include licensed and/or unlicensed spectrum frequency, one or more CCs, one or more Assisted Access Node, or one or more bearers.

In response to receiving the Enable eNB Controlled Radio Resource Modification message from an eNB, in step S1304, the Assisted Access Node may start recording the information of the radio resource utilization according to the configuration in the Enable eNB Controlled Radio Resource Configuration message. The information to be accumulated may include one or more of the total traffic volume transmitted accumulated over the configured radio resource, average or total transmission errors, average or total retransmission attempts, an average buffering delay, an average transmission delay, a retransmission rate, a block error rate, a bit error rate, an average success or fail of unlicensed radio resource occupancy rate, a peak data rate, an average data rate. The information associated with UL and DL may be recorded separately. The radio resource may include licensed and/or unlicensed spectrum frequency, one or more CCs, one or more Assisted Access Node, or one or more bearers. The Assisted Access Node may subsequently transmit an Enable eNB Controlled Radio Resource Modification ACK message to the eNB. The Assisted Access Node may send the recorded information of the radio resource utilization to the eNB periodically or by event. The period of time for an Assisted Access Node to send recorded information of the radio resource utilization may be pre-configured or pre-defined. The event that triggers the Assisted Access Node to send the recorded information of the radio resource utilization to the eNB could be one or more of a status notification, a handover, a release or accept a UE to utilize the radio resource of the Assisted Access Node, and one or more measured QoS parameters exceed the pre-configured or pre-defined threshold. The status notification indicates connection or link failure of a UE, use or release the radio resource of the Assisted Access Node, status of the radio resource availability of the Assisted Access Node, and etc.

In step S1305, the UE may transmit a UE status notification which may include one or more of the following information not limited to: RLF of unlicensed spectrum, unlicensed module being off, and high error rate. In step S1306, the eNB may determine whether to disable or release the radio resource configuration for a UE. The radio resource to be disabled or released may include unlicensed radio resource or one or more CCs for the UE. In step S1307, the eNB may send a Disable eNB Controlled Radio Resource Modification message to the Assisted Access Node. The Disable eNB Controlled Radio Resource Modification message may include one or more of the following information not limited to: an accounting ID which is an identity for associating the usage of the radio resource for a specific eNB controlled radio resource modification, a UE ID, and a bearer ID. In step S1308, the eNB may transmit a Disable eNB Controlled Radio Resource Configuration message to a UE. The Disable eNB Controlled Radio Resource Configuration message may include one or more of the following information not limited to: an accounting ID which is an identity for associating the usage of the radio resource for a specific eNB controlled radio resource configuration, a bearer ID, an access node ID, and a CC ID.

In response to receiving the Disable eNB Controlled Radio Resource Configuration message from the eNB, the UE would stop recording the information of radio resource utilization for the specific accounting ID. The UE may send a Disable eNB Controlled Radio Resource Configuration ACK message to the eNB. Moreover, the UE may also transmit the recorded information of radio resource utilization to the eNB. The recorded information of radio resource utilization may include one or more of the following information not limited to: an accounting ID, a UE ID, a bearer ID, an access node ID, a CC ID, the total traffic volume, the duration of utilizing the configured resource, and values associated with the access related configuration.

In response to the Assisted Access Node receiving the Disable eNB Controlled Radio Resource Modification message from the eNB, the Assisted Access Node may stop recording the information of radio resource utilization for the specific accounting ID. In step S1309, the Assisted Access Node may transmit a Disable eNB Controlled Radio Resource Modification ACK message to the eNB. Moreover, the Assisted Access Node may transmit the recorded information of the radio resource utilization to the eNB. The recorded information of radio resource utilization may include one or more of the following information not limited to: an accounting ID, a UE ID, a bearer ID, an access node ID, a CC ID, the total traffic volume, the duration of utilizing the configured resource, and values associated with the access related configuration.

In step S1310, the eNB may determine the utilization of the radio resource which may include the total traffic volume over specific radio resource such as licensed and/or unlicensed radio resource, CC, or bearer. In step S1310, may transmit the the recorded information of radio resource utilization to a CN element by transmitting a Modify Bearer Request procedure which may include the total traffic volume over licensed and/or unlicensed radio resources, CC, or bearer. Such information could be transmitted to an Online Charging Server (OCS), Offline Charging Server (OFCS), a S-GW, P-GW, PCRF, OAM, or related network element. In step S1313, one of the network element which has received the Modify Bearer Request procedure may subsequently transmit a Modify Bearer Response message to update the configuration of QoS and/or network policy rules to the eNB.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A data rate control method applicable to a user equipment (UE), the method comprising:
transmitting a connection establishment message which comprises an identification (ID) of the UE and a network ID;
receiving a data rate configuration comprising a first data rate class ID and a plurality of network data rates which is associated with the network ID as each network data rate is associated with a different data rate class ID, wherein the first data rate class ID indicates a first data rate class to be applied to communicate with a core network as each of a plurality of data rates classes which comprises the first data rate class ID is mapped to a different maximum data rate, and each of the different data rate class ID comprises an uplink (UL) data rate and a downlink (DL) data rate; and
setting the first data rate class having a first maximum data rate based on the first data rate class ID to communicate with the core network in response to receiving the data rate configuration.

2. The method of claim 1 further comprising:
receiving a modify UE resource configuration message which comprises the network ID and the second data rate class ID associated with the network ID, wherein the second data rate class ID corresponds to a second data rate class having a second maximum data rate; and
setting the second data rate class having the second maximum data rate based on the second data rate class ID to communicate with the RAN.

3. The method of claim 1 further comprising:
setting a first data rate based on the first data rate class ID to communicate with a radio access network (RAN) by setting a first data rate in a radio resource utilized by a specific radio access technology based on the first data rate class ID to communicate with the RAN.

4. The method of claim 2, wherein the modify UE resource configuration message further comprises an applied condition of the first data rate class ID.

5. The method of claim 1 further comprising:
transmitting an UE assistance report which comprises one or a combination of: an average packet buffering time, a buffer status report, retransmission attempts per component carrier, and preference for communication via a specific radio access technology; and
receiving a UE resource configuration message in response to transmitting the UE assistance report.

6. The method of claim 3 further comprising:
receiving a message to disable the radio resource utilized by a specific radio access technology and disabling a component carrier of the radio resource utilized by a specific radio access technology; and
transmitting a status notification associated with a traffic volume information.

7. The method of claim 6 further comprising:
receiving a message to enable the radio resource utilized by a specific radio access technology;
accumulating the traffic volume information in response to receiving the message to enable the radio resource utilized by a specific radio access technology.

8. The method of claim 1, wherein the connection establishment message is a (PDN) packet data network Connection Establishment message which is one of a PDN Connectivity request message, an Attach Request message, a Tracking Area Update Request message, a Service Request message, and a new message.

9. The method of claim 1, wherein the network ID is an access point name (APN) ID which is for establishing a PDN connection with a core network gateway entity associated with the APN ID.

10. The method of claim 4, wherein the modify UE resource configuration message is either a RRCConnectionReconfiguration message or a new message.

11. A data rate control method applicable to a base station, the method comprising:
receiving a connection establishment message which comprises an identification (ID) of the UE and a network ID;
receiving a first data rate configuration message comprising a first data rate class ID, a plurality of network data rates which is associated with the network ID, wherein the first data rate class ID indicates a first data rate class to be applied to communicate with a core network as each of a plurality of data rates classes which comprises the first data rate class ID is mapped to a different maximum data rate and a different data rate class ID, wherein each network data rate is associated with a different data rate class ID, and each of the different data rate class ID comprises an uplink (UL) data rate and a downlink (DL) data rate;
transmitting a second data rate configuration comprising the first data rate class ID which corresponds to the first data rate class having a first maximum data rate and a radio access network (RAN) data rate which is associated with the network ID; and
providing a first data rate from the first data rate class based on the first data rate class ID.

12. The method of claim 11 further comprising:
configuring the plurality of data rate classes which further comprises a second data rate class ID;
transmitting a modify UE resource configuration message which comprises the second data rate class ID associated with the network ID, wherein the second data rate class ID corresponds to a second data rate class having a second maximum data rate; and
providing a second data rate from the second data rate class based on the second data rate class ID.

13. The method of claim 11, wherein in response to the first data rate class ID being applicable to a radio resource utilized by a specific radio access technology, providing the first data rate based on the first data rate class ID to communicate in the radio resource utilized by the specific radio access technology.

14. The method of claim 12, wherein the modify UE resource configuration message further comprises an applied condition of the first data rate class ID.

15. The method of claim 11 further comprising:
receiving an UE assistance report which comprises one or a combination of: an average packet buffering time, a buffer status report, retransmission attempts per component carrier, and preference for communication via a specific radio access technology;
determining whether to use a specific radio access technology based on the UE assistance report; and
transmitting a UE resource configuration message in response to receiving the UE assistance report.

16. The method of claim 15 further comprising:
receiving traffic information from one or more UEs;
receiving traffic information from an access node of the radio resource utilized by a specific radio access technology;
calculating a total traffic volume of at least the radio resource utilized by a specific radio access technology after receiving the traffic information from the one or more UEs and the traffic information from the access node of the radio resource utilized by a specific radio access technology; and
transmitting a modify bearer request message which comprises the total traffic volume information.

17. The method of claim 16 further comprising:
receiving a modify bearer response message which comprises a configuration of policy rules in response to transmitting the modify bearer request message.

18. The method of claim 17 further comprising:
transmitting a message to enable the radio resource utilized by a specific radio access technology; and
receiving a status notification which comprises a traffic volume information.

19. The method of claim 11, wherein the connection establishment message is a (PDN) packet data network Connection Establishment message which is one of a PDN Connectivity request message, an Attach Request message, a Tracking Area Update Request message, a Service Request message, and a new message.

20. The method of claim 11, wherein the network ID is an access point name (APN) ID which is for establishing a PDN connection with a core network gateway entity associated with the APN ID.

21. A user equipment comprising:
a transmitter;
a receiver; and
a processor coupled to the transmitter and the receiver and is configured at least to:
transmitting, via the transmitter, a connection establishment message which comprises an identification (ID) of the UE and a network ID;
receiving, via the receiver, a data rate configuration comprising a first data rate class ID and a plurality of network data rates which is associated with the network ID as each data rate corresponds to a different data rate class ID, wherein the first data rate class ID indicates a first data rate class to be applied to communicate with a core network as each of a plurality of data rates classes which comprises the first data rate class ID is mapped to a different maximum data rate, and each of the different data rate class ID comprises an uplink (UL) data rate and a downlink (DL) data rate; and
setting the first data rate class having a first maximum data rate based on the first data rate class ID to communicate with a radio access network (RAN) and setting the core network data rate based on the network data rate to communicate with a core network in response to receiving the data rate configuration.

22. A base station comprising:
a transmitter;
a receiver; and
a processor coupled to the transmitter and the receiver and is configured at least to:
receiving, via the receiver, a connection establishment message which comprises an identification (ID) of the UE and a network ID;
receiving, via the receiver, a first data rate configuration message comprising a first data rate class ID, a plurality of network data rates which is associated with the network ID wherein the first data rate class ID indicates a first data rate class to be applied to communicate with a core network as each of a plurality of data rates classes which comprises the first data rate class ID is mapped to a different maximum data rate, and a radio access network (RAN) data rate which is associated with the network ID, wherein each network data rate is associated with a different data rate class ID, and each of the different data rate class ID comprises an uplink (UL) data rate and a downlink (DL) data rate;
transmitting, via the transmitter, a second data rate configuration comprising the first data rate class ID which corresponds to the first data rate class having a first maximum data rate and the RAN data rate which is associated with the network ID; and
providing a first data rate from the first data rate class based on the first data rate class ID.

* * * * *

UNITED STATES PATENT AND TRADEMARK OFFICE
CERTIFICATE OF CORRECTION

PATENT NO. : 10,356,655 B2
APPLICATION NO. : 15/399676
DATED : July 16, 2019
INVENTOR(S) : Hung-Chen Chen et al.

It is certified that error appears in the above-identified patent and that said Letters Patent is hereby corrected as shown below:

In the Claims

At Column 28, Claim 11 should read:
11. A data rate control method applicable to a base station, the method comprising:
receiving a connection establishment message which comprises an identification (ID) of the UE and a network ID;
transmitting a first data rate configuration message comprising a first data rate class ID, a plurality of network data rates which is associated with the network ID, wherein the first data rate class ID indicates a first data rate class to be applied to communicate with a core network as each of a plurality of data rates classes which comprises the first data rate class ID is mapped to a different maximum data rate and a different data rate class ID, wherein each network data rate is associated with a different data rate class ID, and each of the different data rate class ID comprises an uplink (UL) data rate and a downlink (DL) data rate;
transmitting a second data rate configuration comprising the first data rate class ID which corresponds to the first data rate class having a first maximum data rate and a radio access network (RAN) data rate which is associated with the network ID; and
providing a first data rate from the first data rate class based on the first data rate class ID.

At Column 30, Claim 22 should read:
22. A base station comprising:
a transmitter;
a receiver; and
a processor coupled to the transmitter and the receiver and is configured at least to:
receiving, via the receiver, a connection establishment message which comprises an identification (ID) of the UE and a network ID;
transmitting, via the transmitter, a first data rate configuration message comprising a first data rate class ID, a plurality of network data rates which is associated with the network ID wherein the first data rate class ID indicates a first data rate class to be applied to communicate with a Signed and Sealed this
Twenty-second Day of July, 2025

Coke Morgan Stewart
*Acting Director of the United States Patent and Trademark Office* core network as each of a plurality of data rates classes which comprises the first data rate class ID is mapped to a different maximum data rate, and a radio access network (RAN) data rate which is associated with the network ID, wherein each network data rate is associated with a different data rate class ID, and each of the different data rate class ID comprises an uplink (UL) data rate and a downlink (DL) data rate;

transmitting, via the transmitter, a second data rate configuration comprising the first data rate class ID which corresponds to the first data rate class having a first maximum data rate and the RAN data rate which is associated with the network ID; and providing a first data rate from the first data rate class based on the first data rate class ID.